US012553790B2

(12) United States Patent
Shao et al.

(10) Patent No.: US 12,553,790 B2
(45) Date of Patent: Feb. 17, 2026

(54) METHODS AND INTERNET OF THINGS SYSTEMS FOR DETERMINING GAS LEAKAGES BASED ON SMART GAS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 280 days.

(21) Appl. No.: 18/183,132

(22) Filed: Mar. 13, 2023

(65) Prior Publication Data

US 2023/0221207 A1     Jul. 13, 2023

(30) Foreign Application Priority Data

Feb. 2, 2023  (CN) .......................... 202310103582.5

(51) Int. Cl.
*G01M 3/24*      (2006.01)
*G01N 29/11*     (2006.01)
(Continued)

(52) U.S. Cl.
CPC ............ *G01M 3/243* (2013.01); *G06N 20/00* (2019.01); *G01N 29/11* (2013.01); *G01N 29/14* (2013.01);
(Continued)

(58) Field of Classification Search
CPC .................. G01M 3/243; G06N 20/00; G01N 2291/2634; G01N 2291/044; G01N 29/14; G01N 29/11
(Continued)

(56) References Cited

U.S. PATENT DOCUMENTS 8,600,566 B1 * 12/2013  Longo .................... G01M 3/00
                                                    700/282
9,024,767 B2 *  5/2015  Ramsay ................... G01F 1/66
                                                    340/506
(Continued)

FOREIGN PATENT DOCUMENTS

CN        114352947 A      4/2022
CN        115330094 A     11/2022
(Continued)

OTHER PUBLICATIONS

Chinese Patent Office, First Office Action 'Smart Gas Flow Correction Method, IOT System, Device, and Medium' 202310095073. 2, Mar. 14, 2023, 15 pages (Year: 2023).*

(Continued)

*Primary Examiner* — Stephanie E Bloss
*Assistant Examiner* — Kevin C Butler
(74) *Attorney, Agent, or Firm* — METIS IP LLC

(57) ABSTRACT

The embodiments of the present disclosure provide methods and Internet of Thing systems for determining a gas leakage based on smart gas. The method may be implemented by a processor of a smart gas safety management platform based on an Internet of Things system for determining a gas leakage, comprising: obtaining first pipeline data located at a plurality of points of a gas pipeline network; determining a target pipeline section based on the first pipeline data; obtaining second pipeline data at both ends of the target pipeline section; determining a location of a gas leakage of the target pipeline section based on the second pipeline data; and feeding the location of the gas leakage back to a terminal of a gas management user.

16 Claims, 8 Drawing Sheets

(51) Int. Cl.
*G01N 29/14* (2006.01)
*G06N 20/00* (2019.01)

(52) U.S. Cl.
CPC .................. *G01N 2291/044* (2013.01); *G01N 2291/2634* (2013.01)

(58) Field of Classification Search
USPC .......................................................... 73/592
See application file for complete search history.

(56) References Cited

U.S. PATENT DOCUMENTS

| | | | | |
|---|---|---|---|---|
| 11,391,615 | B2* | 7/2022 | Appel | G06Q 10/20 |
| 11,821,589 | B2* | 11/2023 | Shao | F17D 1/05 |
| 11,867,548 | B2* | 1/2024 | Shao | G01F 25/15 |
| 2023/0221207 | A1* | 7/2023 | Shao | G01M 3/243 73/592 |

FOREIGN PATENT DOCUMENTS

| | | | | |
|---|---|---|---|---|
| CN | 115356978 | A | 11/2022 | |
| CN | 115496625 | A | 12/2022 | |
| CN | 115545231 | A | 12/2022 | |
| CN | 116668491 | A * | 8/2023 | .............. F24F 11/30 |
| CN | 116680501 | A * | 9/2023 | |
| CN | 117291352 | A * | 12/2023 | ......... G05B 23/0283 |
| CN | 117784697 | A * | 3/2024 | .............. G16Y 10/35 |
| CN | 117853097 | A * | 4/2024 | |
| CN | 118641124 | A * | 9/2024 | |

OTHER PUBLICATIONS

Dilusha et al., Long-Term Water Pipe Condition Assessment: A Semiparametric Model Using Gasussian Process and Survival Analysis, c Springer Nature Switzerland AG 2020 PAKDD 2020, LNAI 12085, pp. 487-499, 2020. (Year: 2020).*

First Office Action in Chinese Application No. 202310103582.5 mailed on Nov. 12, 2025, 18 pages.

* cited by examiner

METHODS AND INTERNET OF THINGS SYSTEMS FOR DETERMINING GAS LEAKAGES BASED ON SMART GAS

CROSS-REFERENCE TO RELATED APPLICATIONS

This application claims priority to Chinese Patent Application No. 202310103582.5, filed on Feb. 2, 2023, the entire contents of which are hereby incorporated by reference.

TECHNICAL FIELD

The present disclosure relates to the field of gas safety, and in particular, to methods and Internet of Things systems for determining a gas leakage based on smart gas.

BACKGROUND

A gas pipeline network is generally laid underground, together with a complex urban environment, which invisibly increases the difficulty of risk investigation of the gas pipeline network and brings huge personal and property losses once a safety accident occurs. In the prior art, it is generally to determine whether a gas leakage occurs in the gas pipeline network through manual inspection, deployment of an on-site monitoring device such as a sensor, etc., combined with the upper monitoring software, etc., which is relatively difficult to monitor the gas leakage of some concealed locations or invisible underground locations.

Therefore, it is necessary to provide methods for determining a gas leakage based on smart gas to ensure reliable operation of the gas pipeline network.

SUMMARY

According to one or more embodiments of the present disclosure, a method for determining a gas leakage based on smart gas is provided. The method may be implemented by a processor of a smart gas safety management platform based on an Internet of Things system for determining a gas leakage. The method may include obtaining first pipeline data located at a plurality of points of a gas pipeline network; determining a target pipeline section based on the first pipeline data; determining a target pipeline section based on first pipeline data; obtaining second pipeline data at both ends of the target pipeline section; determining a location of a gas leakage of the target pipeline section based on the second pipeline data; and feeding the location of the gas leakage back to a terminal of a gas management user.

According to one or more embodiments of the present disclosure, an Internet of Things system for determining a gas leakage based on smart gas is provided. The Internet of Things system may include a smart gas user platform, a smart gas service platform, a smart gas safety management platform, a smart gas pipeline network device sensor network platform, and a smart gas pipeline network device object platform. The smart gas pipeline network device object platform may be configured to collect the first pipeline data and the second pipeline data at a plurality of points of a gas pipeline network; and transmit the first pipeline data and the second pipeline data to the smart gas safety management platform through the smart gas pipeline network device sensor network platform. A processor of the smart gas safety management platform may be configured to obtain first pipeline data located at a plurality of points of the gas pipeline network; determine a target pipeline section based on the first pipeline data; obtain second pipeline data at both ends of the target pipeline section; determine a location of the gas leakage of the target pipeline section based on the second pipeline data; and feed the location of the gas leakage back to a terminal of a gas management user.

According to one or more embodiments of the present disclosure, a non-transitory computer-readable storage medium storing computer instructions is provided. When reading the computer instructions in the storage medium, the computer may execute the method for determining a gas leakage based on smart gas.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
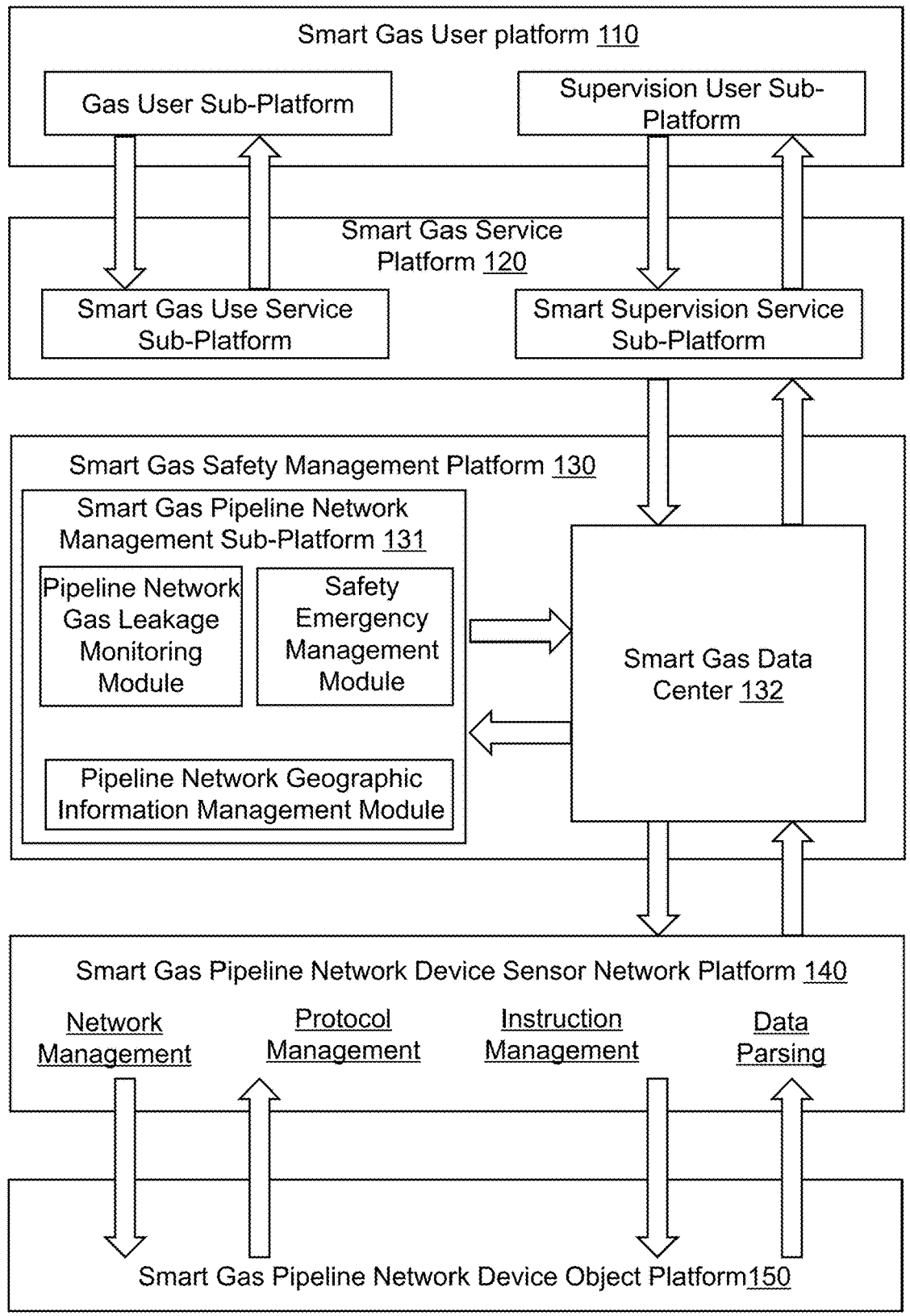
FIG. 1 is a schematic diagram illustrating an Internet of Things system for determining a gas leakage according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an Internet of Things system for determining a gas leakage according to some embodiments of the present disclosure.

The Internet of Things system is an information processing system that includes some or all of a user platform, a service platform, a management platform, a sensor network platform, and an object platform. The user platform is a functional platform that realizes obtaining of perceptual information of a user and generation of control information of the user. The service platform may connect the management platform and the user platform and plays functions of perceptual information service communication and control information service communication. The management platform may overall plan and coordinate connection and collaboration between the functional platforms (e.g., the user platform and the service platform). The management platform aggregates information of an Internet of Things operation system and may provide functions of perception management and control management for the Internet of Things operation system. The sensor network platform may connect the management platform and the object platform to realize functions of perceptual information sensor communication and control information sensor communication. The object platform is a functional platform that generates the perceptual information and executes the control information.

Processing of information in the Internet of Things system may be divided into a processing flow of perceptual information of the user and a processing flow of control information of the user. The control information may be information generated based on the perceptual information of the user. In some embodiments, the control information may include user demand control information and the user perceptual information may include user query information. The processing of the perceptual information is that the object platform obtains the perceptual information and transmits the perceptual information to the management platform through the sensor network platform, the management platform interacts with the service platform for the perceptual information, the service platform transmits the perceptual information to the user platform, and the user platform finally obtains the perceptual information. The user demand control information is sent from the user platform to the service platform, the service platform transmits the control information to the management platform, the management platform sends the control information to the object platform through the sensor network platform, and finally the object platform executes an instruction of the control information.

In some embodiments, the Internet of Things system 100 for determining a gas leakage may include a smart gas user platform 110, a smart gas service platform 120, a smart gas safety management platform 130, a smart gas pipeline network device sensor network platform 140, and a smart gas pipeline network device object platform 150.

The smart gas user platform 110 may be a platform configured to interact with a user. The user may be a gas user, a manager, a maintenance engineer, etc. For example, a gas user may be a general gas user, a commercial gas user, an industrial gas user, etc. The manager may be a supervision user, etc. In some embodiments, the smart gas user platform 110 may be configured as a terminal device. For example, the terminal device may include a mobile device, a tablet computer, or the like, or any combination thereof.

In some embodiments, the smart gas user platform 110 may be configured to receive a request and/or instruction input by the user. For example, the smart gas user platform 110 can obtain an instruction for querying gas pipeline network device safety information through the terminal device. In some embodiments, the smart gas user platform 110 may feedback information to the user through the terminal device. For example, the smart gas user platform 110 can display warning information (e.g., a leakage occurs in a section of a gas pipeline network) to the user through the terminal device (e.g., a display). In some embodiments, the smart gas user platform 110 may send the request and/or instruction input by the user to the smart gas service platform 120 and obtain corresponding information fed back by the smart gas service platform 120.

In some embodiments, the smart gas user platform 110 may include a gas user sub-platform and a supervision user sub-platform. The gas user sub-platform corresponds to a smart gas use service sub-platform. For example, the gas user sub-platform may obtain information such as gas consumption, cost, etc. of the gas user from the smart gas use service sub-platform and feedback the information to the user. As another example, the gas user sub-platform can send prompt information, alarm information, etc. of gas use to the gas user through the terminal device. The supervision user sub-platform corresponds to a smart supervision service sub-platform. In some embodiments, the supervision user may supervise and manage safe operation of the entire Internet of Things system through the supervision user sub-platform to ensure the safe and orderly operation of the Internet of Things system 100 for determining a gas leakage.

The smart gas service platform 120 may be a platform configured to transmit user demand and control information, which connects the smart gas user platform 110 and the smart gas safety management platform 130. The smart gas service platform 120 may obtain data from the smart gas safety management platform 130 (e.g., a smart gas data center) and send the data to the smart gas user platform 110. In some embodiments, the smart gas service platform 120 may include a processing device and other components. The processing device may be a server or a server group.

In some embodiments, the smart gas service platform 120 may include the smart gas use service sub-platform and the smart supervision service sub-platform. The smart gas use service sub-platform may be a platform that provides a gas use service for the gas user, which corresponds to the gas user sub-platform. For example, the smart gas use service sub-platform can send information such as a gas bill, a gas safety guideline, and a gas abnormality reminder of the gas user to the gas user sub-platform, and the information may be fed back to the gas user. The smart supervision service sub-platform may be a platform that provides a supervision service for the supervision user, which corresponds to the supervision user sub-platform. For example, the smart supervision service sub-platform can send safety management information of a gas device and scheduling information of a maintenance project to the supervision user sub-platform and the supervision user can review, supervise, and guide safety management of the gas device and scheduling of the maintenance project.

The smart gas safety management platform 130 refers to a platform that overall plans and coordinates the connection and collaboration between the various functional platforms, aggregates all the information of the Internet of Things, and provides the functions of perception management and control management for the Internet of Things operation system. In some embodiments, the smart gas safety management platform 130 may include a processing device and other components. The processing device may be a server or a server group. In some embodiments, the smart gas safety management platform 130 may be a remote platform operated by a manager, artificial intelligence, or a preset rule.

In some embodiments, the smart gas safety management platform 130 may include a smart gas network management sub-platform 131 and a smart gas data center 132.

The smart gas pipeline network management sub-platform 131 may be a platform configured to analyze and process data. In some embodiments, the smart gas pipeline network management sub-platform 131 may interact with the smart gas data center 132 bidirectionally. For example, the smart gas pipeline network management sub-platform 131 may obtain data related to safety management (e.g., first pipeline data) from the smart gas data center 132 for analysis and processing and send a processing result to the smart gas data center 132.

In some embodiments, the smart gas pipeline network management sub-platform 131 may include a pipeline network gas leakage monitoring module, a safety emergency management module, and a pipeline network geographic information management module. The pipeline network gas leakage monitoring module may be configured to process operation gas data of a pipeline network device in the smart gas pipeline network device object platform 150 (e.g., a location of the gas leakage) to provide data support for a safety emergency response scheme. The safety emergency management module may form an emergency treatment scheme based on a safety risk of the pipeline network device. The pipeline network geographic information management module may view geographic information and attribute information of pipelines and devices in real time to provide data support for an on-site operation. In some embodiments, the smart gas data center 132 automatically sends the obtained relevant safety data to the corresponding pipeline network gas leakage monitoring module by identifying a safety parameter category (e.g., a gas pipeline sound feature, a vibration feature). The pipeline network gas leakage monitoring module presets a safety monitoring threshold, alarms automatically at the management platform when the threshold is exceeded, and optionally pushes alarm information to the user (e.g., the supervision user) automatically. In some embodiments, the smart gas pipeline network management sub-platform 131 may also include a pipeline network risk assessment management module, a pipeline network inspection safety management module, a station inspection safety management module, a pipeline network gas leakage monitoring module, a station gas leakage monitoring module, a station device safety monitoring module, and a pipeline network simulation management module, etc. It should be noted that the above management modules are not intended to limit the management modules included in the smart gas pipeline network management sub-platform 131.

The smart gas data center 132 may be configured to store and manage all operation information of the Internet of Things system 100 for determining a gas leakage. In some embodiments, the smart gas data center 132 may be configured as a storage device (e.g., a database) for storing historical and current gas safety data. For example, the smart gas data center 132 may store safety information of the gas pipeline network, scheduling records of maintenance engineers, abnormal information of the gas pipeline network, etc.

In some embodiments, the smart gas safety management platform 130 may interact with the smart gas service platform 120 and the smart gas pipeline network device sensor network platform 140, respectively through the smart gas data center 132 for information. For example, the smart gas data center 132 can receive an instruction issued by the smart gas service platform 120 (e.g., the smart supervision service sub-platform) for querying the gas pipeline network abnormal information of the maintenance engineers and send a query result to the smart gas service platform 120. As another example, the smart gas data center 132 can send an instruction for obtaining data related to the gas pipeline of the gas pipeline network (e.g., first pipeline data or second pipeline data) to the smart gas pipeline network device sensor network platform 140 (e.g., the smart gas device sensor network sub-platform) and receive the data related to the gas pipeline uploaded by the smart gas pipeline network device sensor network platform.

The smart gas pipeline network device sensor network platform 140 may be a functional platform for managing sensor communication. In some embodiments, the smart gas pipeline network device sensor network platform 140 may be connected to the smart gas safety management platform 130 and the smart gas pipeline network device object platform 150 to realize the functions of perceptual information sensor communication and control information sensor communication.

In some embodiments, the smart gas network device sensor network platform 140 may be configured to realize a function such as network management, protocol management, instruction management, data parsing, etc.

The smart gas pipeline network device object platform 150 may be a functional platform for generating the perceptual information and executing the control information. For example, the smart gas pipeline network device object platform 150 can generate safety operation information of the gas pipeline network (e.g., abnormal information of the gas pipeline network) and upload the safety operation information of the gas pipeline network to the smart gas data center 132 through the smart gas pipeline network device sensor network platform 140. The smart gas pipeline network device object platform 150 may also receive control information (e.g., collecting the first pipeline data) issued by the smart gas safety management platform 130 through the smart gas pipeline network device sensor network platform 140 and execute an instruction of the control information.

In some embodiments, the smart gas pipeline network device object platform 150 may be configured as various types of gas devices (e.g., a gas pipeline network device) and monitoring devices that may be configured to obtain operation information of the gas device. For example, the smart gas pipeline network device object platform 150 may obtain an indicator such as gas flow, pressure, temperature, etc. of the gas pipeline network device in real time through a gas flow meter, a pressure sensor, a temperature sensor, etc. and send the indicator to the smart gas data center 132 through the smart gas pipeline network device sensor network platform 140.

In some embodiments of the present disclosure, based on the Internet of Things system 100 for determining a gas leakage, a closed loop of smart gas safety management information operation among the pipeline network device, the gas operator, the gas user, and the supervision user may be formed, which can realize informatization and intellectualization of pipeline network safety management and ensure effective management of gas safety.

It should be noted that the Internet of Things system 100 for determining a gas leakage is merely provided for the purposes of illustration, and not intended to limit the scope of the present disclosure. For those skilled in the art, various amendments and variations can be made according to the description of the present disclosure. For example, the Internet of Things system 100 for determining a gas leakage can include one or more other suitable components to achieve similar or different functions. However, the amendments and variations will not depart from the scope of the present disclosure.

Figure 2:
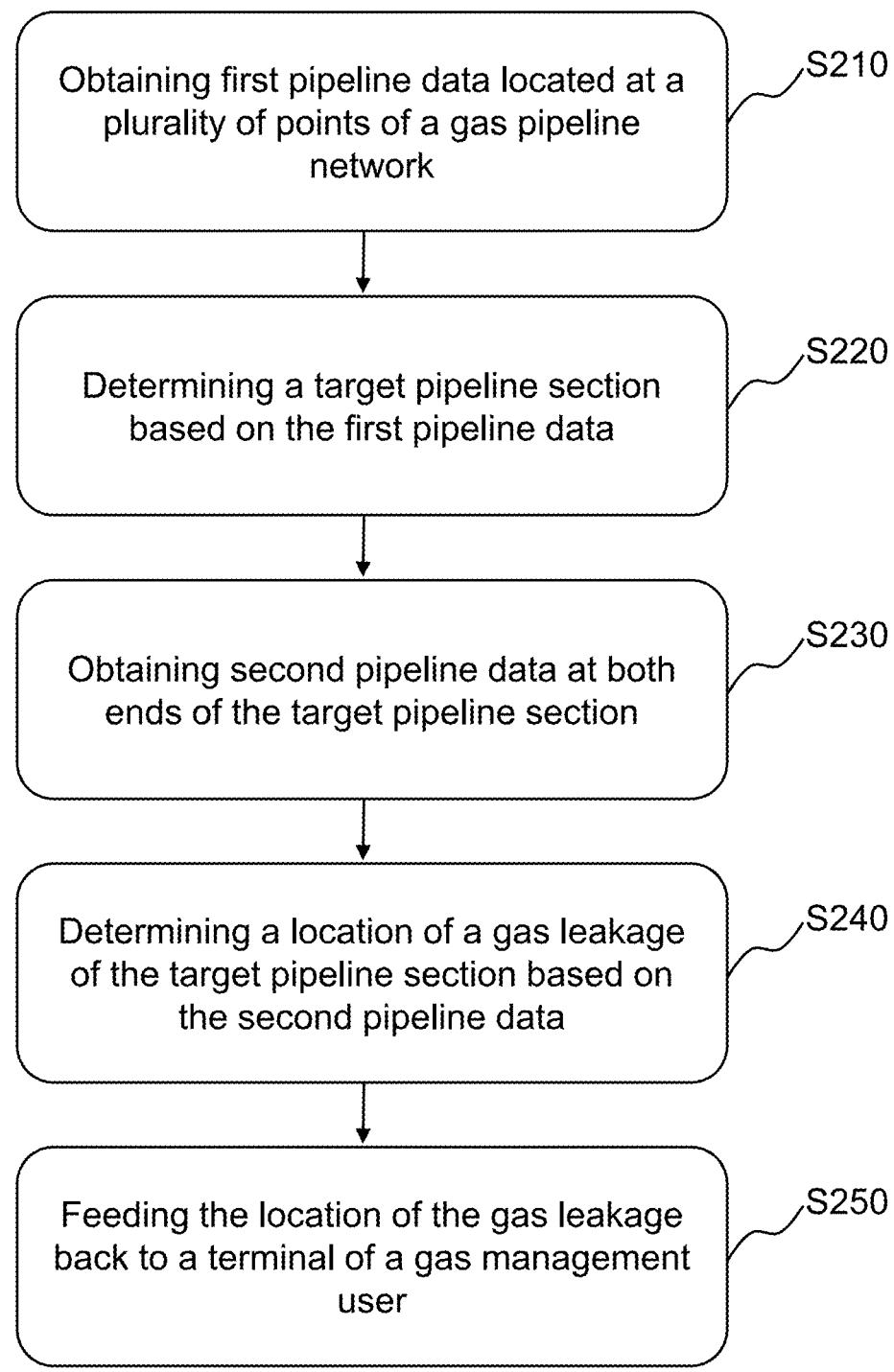
FIG. 2 is a flowchart illustrating an exemplary process of a method for determining a gas leakage based on smart gas according to some embodiments of the present disclosure.

FIG. 2 is a flowchart illustrating an exemplary process of a method for determining a gas leakage based on smart gas according to some embodiments of the present disclosure. As shown in FIG. 2, the process 200 includes the steps described below. In some embodiments, the process 200 may be performed by a processor of the smart gas safety management platform 130.

In S210, obtaining first pipeline data located at a plurality of points of a gas pipeline network.

The plurality of points of the gas pipeline network refers to data collection points preset on a gas pipeline of the gas pipeline network. The smart gas pipeline network device object platform 150 may collect the first pipeline data of the corresponding gas pipeline based on the corresponding points. For example, a point of the gas pipeline where an intersection is located or a point of the gas pipeline at an interval of a distance (e.g., 1 km) may be determined as the point for collecting the first pipeline data.

The first pipeline data is data related to a gas leakage point of the gas pipeline. The first pipeline data may be sound data or vibration data. In some embodiments, the first pipeline data is pipeline vibration data at the plurality of points of the gas pipeline network. In some embodiments, the pipeline vibration data may be indicated as a vibration frequency. For example, the vibration frequency at point 1 of the gas pipeline network is 15 Hz.

In some embodiments, the smart gas pipeline network device sensor network platform 140 may obtain the first pipeline data through the smart gas pipeline network device object platform 150 based on one or more vibration sensors configured in the gas pipeline network.

In S220, determining a target pipeline section based on the first pipeline data.

The target pipeline section refers to a pipeline section related to the gas leakage. In some embodiments, the target pipeline section may be a suspicious gas leakage pipeline section. For example, if the smart gas safety management platform 130 analyzes the first pipeline data uploaded by the smart gas pipeline network device sensor network platform 140 and finds that the vibration data at point 3 of the gas pipeline network is abnormal, the pipeline section where the point 3 is located may have the gas leakage and may be determined as the target pipeline section. The vibration data being abnormal means that the vibration data exceeds a threshold, for example, the vibration frequency exceeds a set vibration threshold of 15 Hz.

In some embodiments, the smart gas safety management platform 130 may determine the target pipeline section by setting a vibration threshold. For example, when the first pipeline data exceeds the vibration threshold, a pipeline corresponding to that first pipeline data is determined as the target pipeline section. For example, if the smart gas safety management platform 130 sets a default vibration threshold of 15 Hz and the vibration frequency corresponding to point 3 is 20 Hz, the pipeline section where point 3 is located is determined as the target pipeline section. Further description regarding determining the target pipeline section may be found in FIG. 3.

In S230, obtaining second pipeline data at both ends of the target pipeline section.

The second pipeline data refers to data related to the target pipeline section. For example, the second pipeline data can be pipeline vibration data located in the target pipeline section. For example, the second pipeline data can be a vibration frequency at any point of the target pipeline section.

In some embodiments, the second pipeline data is pipeline vibration data at both ends of the target pipeline section. The smart gas safety management platform 130 may obtain the second pipeline data in a plurality of manners, for example, after determining the target pipeline section, the smart gas safety management platform 130 may further obtain the second pipeline data at both ends of the target pipeline section based on one or more vibration sensors configured in a gas pipeline network device of the smart gas object platform 150.

In S240, determining a location of a gas leakage of the target pipeline section based on the second pipeline data.

The smart gas safety management platform 130 may determine the location of the gas leakage of the target pipeline section in a plurality of ways. For example, a point with abnormal vibration data may be directly determined as the location of the gas leakage.

As another example, the smart gas safety management platform 130 can determine the location of the gas leakage of the target pipeline section by dichotomization. Exemplarily, if the second pipeline data at the left of the target pipeline section is greater than the second pipeline data at the right, a midpoint of the target pipeline section is determined as a right endpoint of a new target pipeline section, a left endpoint of an original target pipeline section is determined as a left endpoint of the new target pipeline section. The new target pipeline section is determined based on the second pipeline data at both ends of the new target pipeline section and the location of the gas leakage of the target pipeline section is finally determined. Further description regarding determining the location of the gas leakage may be found in FIG. 4.

In S250, feeding the location of the gas leakage back to a terminal of a gas management user.

A gas management user refers to a user of a supervision user sub-platform in the smart gas user platform 110 corresponding to a smart supervision service sub-platform. In some embodiments, in response to the location of the gas leak received by the terminal of the gas management user fed back by the smart gas data center 132, the supervision user sub-platform may generate a maintenance engineer dispatching instruction to dispatch the maintenance engineer in the smart gas pipeline network device object platform 150 to the location of the gas leakage and the terminal of the maintenance engineer performs maintenance on the location of the gas leakage based on the dispatching instruction.

According to one or more embodiments of the present disclosure, the target pipeline section is determined by collecting the first pipeline data; and the location of the gas leakage is determined by determining the second pipeline data of the target pipeline section, so that the suspicious pipeline section may be determined in time based on the pipeline data and a potential gas leakage point of the gas pipeline network is inspected to prevent the gas leakage before occurring.

Figure 3:
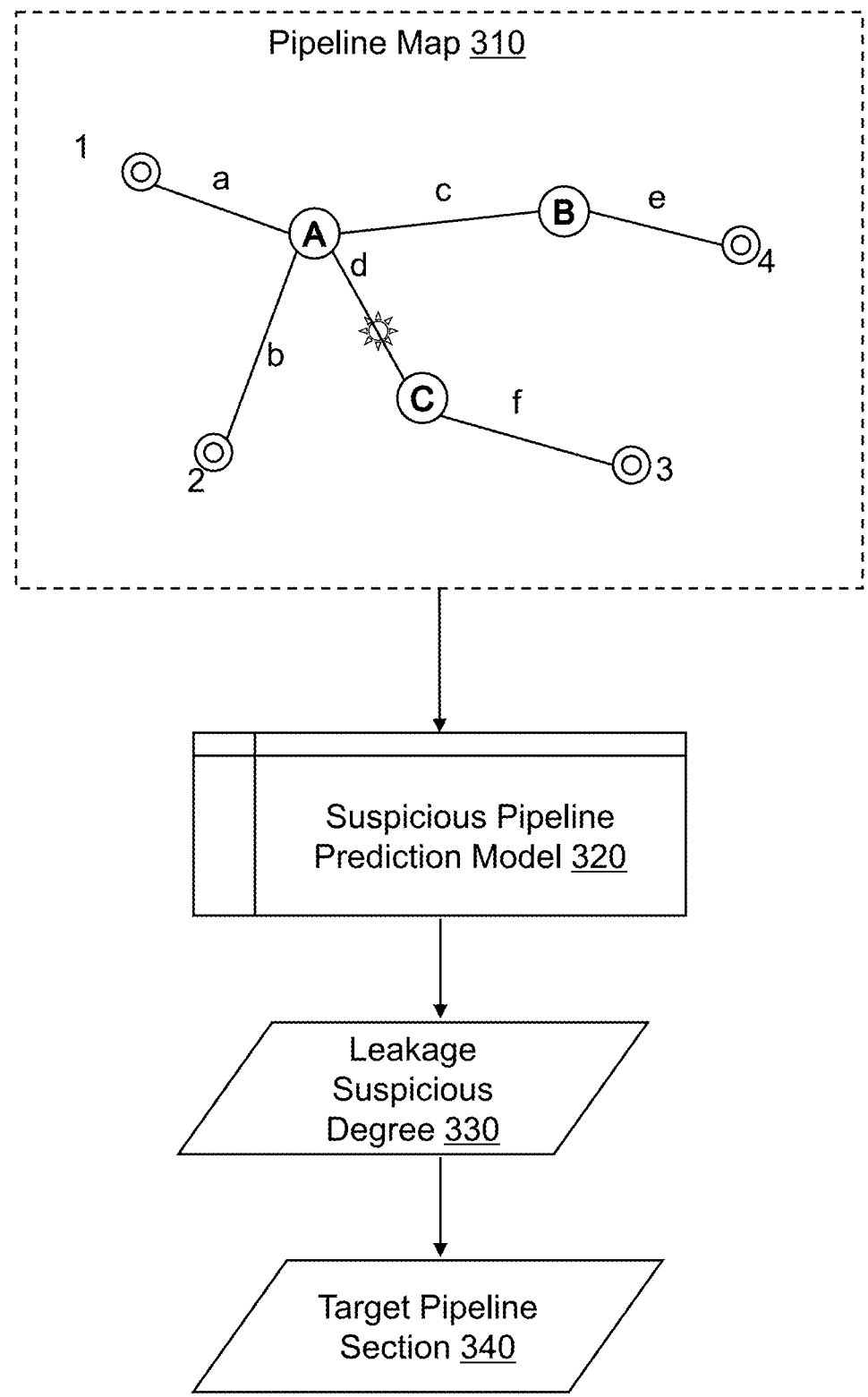
FIG. 3 is a schematic diagram illustrating an exemplary suspicious pipeline prediction model according to some embodiments of the present disclosure.

FIG. 3 is a schematic diagram illustrating an exemplary suspicious pipeline prediction model according to some embodiments of the present disclosure.

In some embodiments, determining a target pipeline section based on the first pipeline data may include: constructing a pipeline map of the gas pipeline network based on feature information of the gas pipeline network. The pipeline map includes a node and an edge. The node of the pipeline map may correspond to an intersection of pipeline sections, an inflection point of the pipeline section, or an installing location of a vibration sensor of the pipeline section and an edge of the pipeline map may correspond to the pipeline section. In some embodiments, a node feature of the node includes a torsional angle and a vibration feature and an edge feature of the edge includes a global feature of the pipeline section. In some embodiments, the smart gas safety management platform 130 may determine a leakage suspicious degree of each pipeline in the pipeline map through a suspicious pipeline prediction model based on the pipeline map. In some embodiments, as shown in FIG. 3, the smart gas safety management platform 130 may determine the leakage suspicious degree 330 of each pipeline in the pipeline map through the suspicious pipeline prediction model 320 based on the pipeline map 310; and determine the target pipeline section 340 based on the leakage suspicious degree 330.

The suspicious pipeline prediction model may be a machine learning model. For example, a type of the suspicious pipeline prediction model may be a Recurrent Neural Network (RNN) model, a Deep Neural Network (DNN) model, a Graph Neural Network (GNN) model, etc.

In some embodiments, an input of the suspicious pipeline prediction model 320 may include the pipeline map 310.

A pipeline map is a map used to reflect a connection relationship of each pipeline in the gas pipeline network. In some embodiments, the smart gas safety management platform 130 may construct the pipeline map of the gas pipeline network based on the feature information of the gas pipeline network. The pipeline map includes the node and the edge. The node corresponds to the intersection of the pipeline sections, the inflection point of the pipeline section, or the installing location of the vibration sensor of the pipeline section and the edge corresponds to the pipeline section.

The node feature of the node includes the torsional angle and the vibration feature. The torsion angle is an angle between pipeline sections corresponding to both sides connected by the node. For example, the node feature corresponding to the node between two perpendicular pipeline sections may include a torsion angle of 90°; the node feature of the node between pipeline sections on a same line may include a torsion angle of 0°. As another example, the node feature of the node corresponding to three or more edges may include a plurality of torsion angles. For example, if node A of the pipeline map 310 in FIG. 3 is connected to four edges, the node feature of node A may include four torsion angles, which are an angle between edge a and edge b, an angle between edge b and edge d, an angle between edge d and edge c, and an angle between edge c and edge a, respectively.

The vibration feature of the node is a feature that reflects vibration data of a pipeline. The vibration feature of the node may include a vibration amplitude and a vibration frequency of a location of the node. For example, the vibration feature may include the vibration amplitude of 3.5 mm and the vibration frequency of 10 Hz.

In some embodiments, if the node of the pipeline map is a node with no vibration sensor deployed (e.g., merely a node where the intersection of the pipeline sections, the inflection point of the pipeline section is located), the vibration feature of the node feature may be empty or indicated by a preset marker such as 0 or x, etc. Merely by way of example, nodes A, B, and C of the pipeline map 310 in FIG. 3 are nodes with no vibration sensor deployed. Node A is the intersection of the pipeline sections and nodes B and C are inflection points of the pipeline sections. nodes 1, 2, 3, and 4 are nodes where vibration sensors are installed.

The edge feature of the edge includes the global feature of the pipeline section. For example, the edge feature may be a pipeline section length, pipeline section material, and a pipeline section internal diameter.

The feature information is an information collection composed of the global feature of the pipeline section, the torsion angle between the pipeline sections, and the vibration feature of the intersection of the pipeline sections, the inflection point of the pipeline section, or the installing location of the vibration sensor of the pipeline section. The smart gas safety management platform 130 may obtain a location where the intersection of the pipeline sections, the inflection point of the pipeline section, or the installation of the vibration sensor of the pipeline section is located, the torsion angle between the pipeline sections, and the global feature of the pipeline section through a pipeline network geographic information management module in the Internet of Things system 100 for determining a gas leakage and obtain the vibration feature of the intersection of the pipeline sections, the inflection point of the pipeline section, or the installing location of the vibration sensor of the pipeline section through one or more vibration sensors arranged in the gas pipeline network. The location where the intersection of the pipeline sections, the inflection point of the pipeline section, or the installation of the vibration sensor of the pipeline section is located, the vibration feature of the intersection of the pipeline sections, the inflection point of the pipeline section, or the installing location of the vibration sensor of the pipeline section, the torsion angle between the pipeline sections, and the global feature of the pipeline section may constitute the feature information.

In some embodiments, the pipeline map may be constructed using the location where the intersection of the pipeline sections, the inflection point of the pipeline section, or the installation of the vibration sensor of the pipeline section is located in the feature information as the node of the pipeline map and using each pipeline section in the feature information as the edge. Exemplarily, as shown in FIG. 3, the nodes of the pipeline mapping 310 may include the intersections of the pipeline sections and the inflection points of the pipeline sections, such as node A, node B, and node C. The nodes of the pipeline mapping may also include the installing locations of the vibration sensors of the pipeline sections, such as node 1, node 2, node 3, and node 4. The edges of the pipeline mapping may include a, b, c, d, e, and f.

In some embodiments, the edge feature of the pipeline map also includes a pipeline section feature vector. The pipeline section feature vector refers to a vector consisting of a plurality of pipeline section features. The pipeline section feature may include a feature of an environment where the pipeline section is located. For example, the pipeline section feature may be an exposure degree of the pipeline section to air, temperature and humidity of an outer covering soil layer of the pipeline section, density of the soil layer, etc.

For example, the pipeline section feature vector L can be indicated as L=(e, t, h, p), where e denotes the exposure degree of the pipeline section to air, t denotes the temperature of the outer covering soil layer of the pipeline section, h indicates a humidity of the outer covering soil layer of the pipeline section, and p denotes the density of the soil layer. Merely by way of example, if the section feature vector L=(20, 30, 50, 1.4) of pipeline section P, it means that the exposure degree of pipeline section P to air is 20%, the temperature of the outer covering soil layer of pipeline section P is 30° C., the humidity of the soil layer of pipeline section P is 50% RH, and the density of soil layer is 1.4 g/cm$^3$. The pipeline section feature may be obtained through the pipeline network geographic information management module.

In some embodiments, the pipeline section feature vector may be determined by a pipeline feature embedding layer in a leakage suspicious degree determination model based on a pipeline unit feature sequence.

The pipeline unit feature sequence is a sequence consisting of pipeline unit features. The pipeline unit feature is a pipeline section feature corresponding to a unit pipeline with a shorter length in the pipeline section. For example, a step length may be preset based on experience and the pipeline section feature corresponding to one unit pipeline may be collected at every one step length. The pipeline unit feature sequence may be composed of pipeline unit features at different locations. Exemplarily, the pipeline unit feature sequence Cp of pipeline section P can be indicated as Cp={Cp1, Cp2, Cp3, . . . , Cpn}, indicating that the pipeline section is divided into n unit pipelines, and Cp1, Cp2, Cp3, . . . , Cpn correspond to the pipeline section features of pipelines from a 1$^{st}$ unit to a n$^{th}$ unit, respectively.

In some embodiments, the pipeline feature embedding layer of the leakage suspicious degree determination model may determine the pipeline section feature vector by processing the pipeline unit feature sequence. Further description regarding the leakage suspicious degree determination model may be found in FIG. 5.

In some embodiments, the edge feature of the pipeline map may also include a sequence element feature of the pipeline unit feature sequence.

The sequence element feature may reflect element feature information of an element included in the pipeline unit feature sequence. Each sub-feature of the sequence element feature corresponds to one element feature of the element in the pipeline unit feature sequence. For example, the sequence element feature can include a count of elements, element density, etc. in the pipeline unit feature sequence. Exemplarily, for the pipeline unit feature sequence Cp={Cp1, Cp2, Cp3}, the count of elements is 3. The element density may be configured to indicate a density degree of location distribution of unit pipelines. For example, the more unit pipelines are distributed per unit distance, the higher the element density in the element feature of the pipeline unit feature sequence. Exemplarily, the sequence element feature can be indicated as "(Cp, 100, 3, 0.03)", indicating that the length of pipeline section P is 100 m, the unit feature sequence Cp of pipeline section P includes 3 sections of unit pipelines, and the element density is 0.03.

In some embodiments, the suspicious pipeline prediction model 320 may output the leakage suspicious degree 330 of the pipeline section corresponding to each edge based on extraction of the edge feature and the node feature of the pipeline map.

The leakage suspicious degree output by each edge is configured to indicate probability of the gas leakage of the pipeline section corresponding to the edge. The higher the probability of the gas leakage of the gas pipeline, the higher the leakage suspicious degree is. The leakage suspicious degree may be indicated as a percentage. The larger the percentage, the more likely the gas leakage may occur.

Merely by way of example, after the pipeline map 310 is input into the suspicious pipeline prediction model 320, the suspicious pipeline prediction model 320 can extract the node features of node A, node B, and node C, the node features of node 1, node 2, node 3, and node 4, and the edge features of edges a, b, c, d, e, and f in the pipeline map 310 and process the node features and the edge features of the pipeline map. The leakage suspicious degree 330 corresponding to each edge may be output by each edge.

Figure 5:
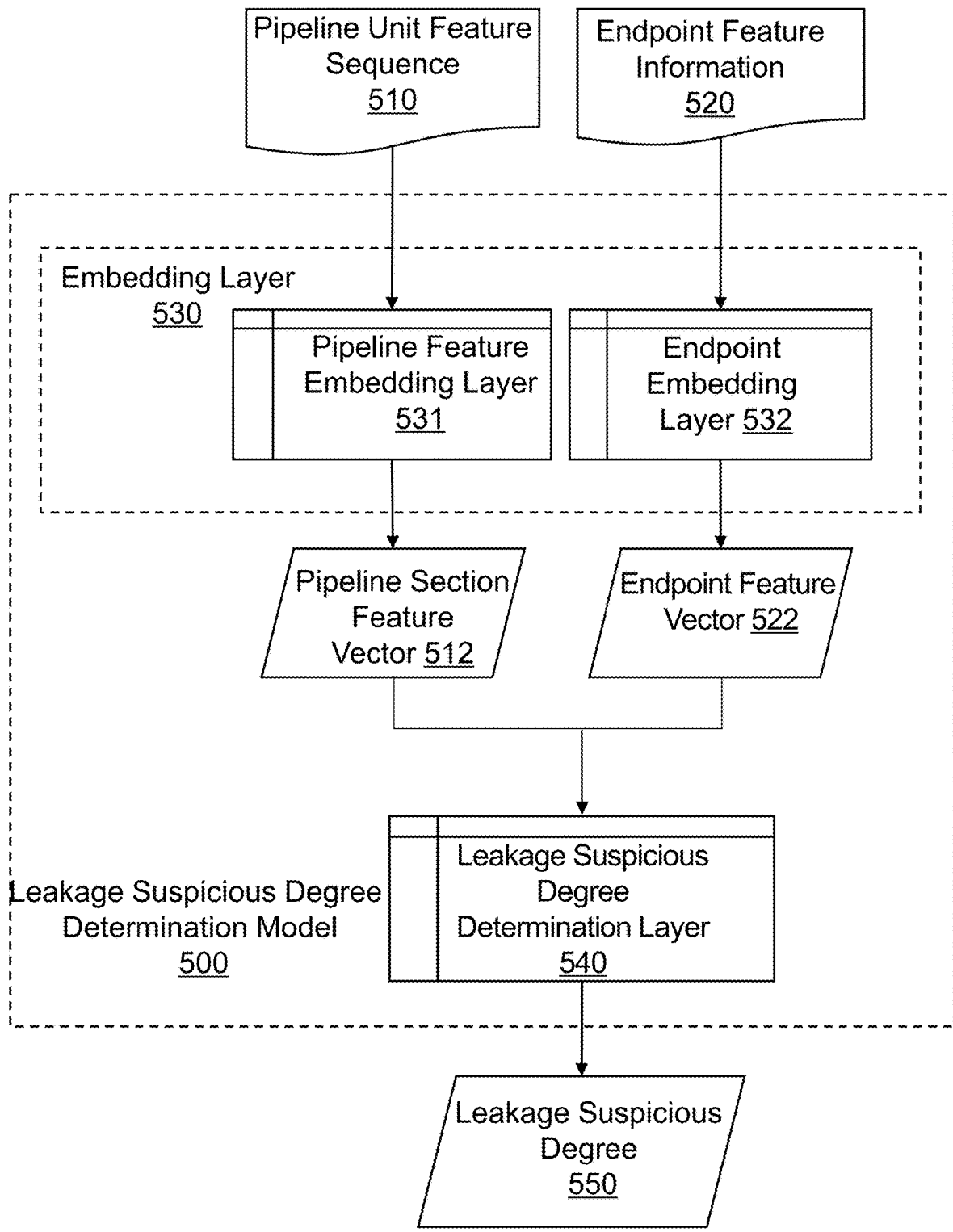
FIG. 5 is a schematic diagram illustrating an exemplary leakage suspicious degree determination model according to some embodiments of the present disclosure.

Other ways for determining the suspicious leakage degree may be found in FIG. 5.

In some embodiments, the suspicious pipeline prediction model 320 may be obtained through a great number of first training samples with labels. The first training sample may include a sample pipeline map. The label of the first training sample may be a tag that indicates whether a leakage occurs in a pipeline section corresponding to an edge of the sample pipeline map. If the leakage occurs in the pipeline section, the tag that indicates whether the edge corresponding to the pipeline section in the pipeline map is abnormal is marked as 1. If no leakage occurs in the pipeline section, the tag that indicates whether the edge corresponding to the pipeline section in the pipeline map is abnormal is marked as 0.

When the suspicious pipeline prediction model is trained, the sample pipeline map of the first training sample may be input into the suspicious pipeline prediction model. A first loss function may be constructed based on the leakage suspicious degree output by the suspicious pipeline prediction model and the label of the first training sample and a parameter of an initial suspicious pipeline prediction model may be updated iteratively based on the first loss function until a third preset condition is satisfied. The parameter of the suspicious pipeline prediction model may be determined and a trained suspicious pipeline prediction model may be obtained. The third preset condition may include, but is not limited to, convergence of the first loss function, a training period reaching a threshold, etc.

In one or more embodiments of the present disclosure, the leakage suspicious degree of the pipeline may be predicted by inputting the pipeline map constructed based on a pipeline information network into the suspicious pipeline prediction model, so as to determine the target pipeline section, which can more accurately predict whether the leakage occurs in the pipeline, determine the pipeline section that the leakage may occur in, facilitate timely maintenance of the gas pipeline network, and ensure safe operation of the gas pipeline network.

In some embodiments, the smart gas safety management platform 130 may determine the target pipeline section based on the leakage suspicious degree output by the trained suspicious pipeline prediction model. For example, the pipeline section with a highest leakage suspicious degree is determined as the target pipeline section.

Figure 4:
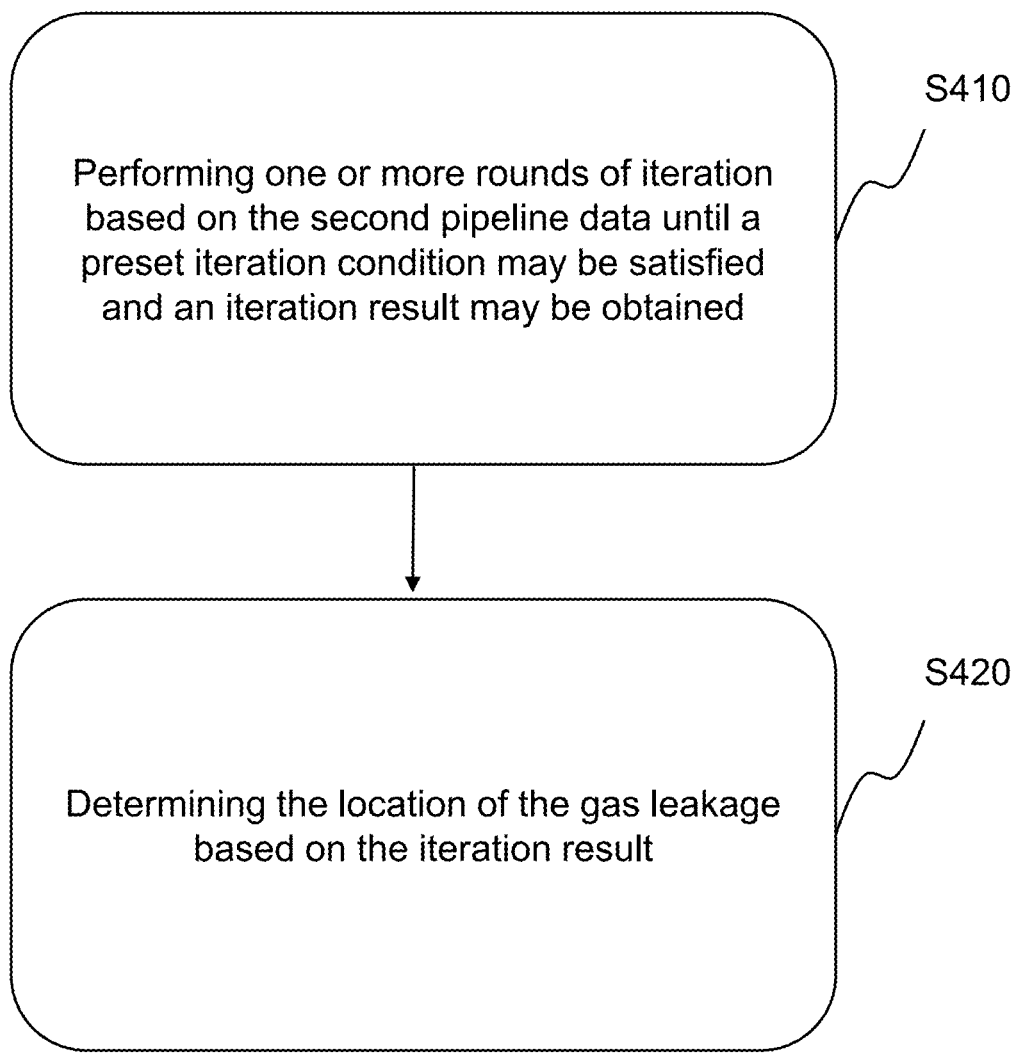
FIG. 4 is a flowchart illustrating an exemplary process for determining a location of a gas leakage according to some embodiments of the present disclosure.

FIG. 4 is a flowchart illustrating an exemplary process for determining a location of a gas leakage according to some embodiments of the present disclosure. As shown in FIG. 4, the process 400 includes the following operations. In some embodiments, the process 400 may be performed by the smart gas safety management platform 130.

In S410, performing one or more rounds of iteration based on the second pipeline data until a preset iteration condition may be satisfied and an iteration result may be obtained.

In some embodiments, the second pipeline data refers to pipeline vibration data at both ends of a target pipeline section. Further description regarding the second pipeline data may be found in FIG. 2.

Figure 8:
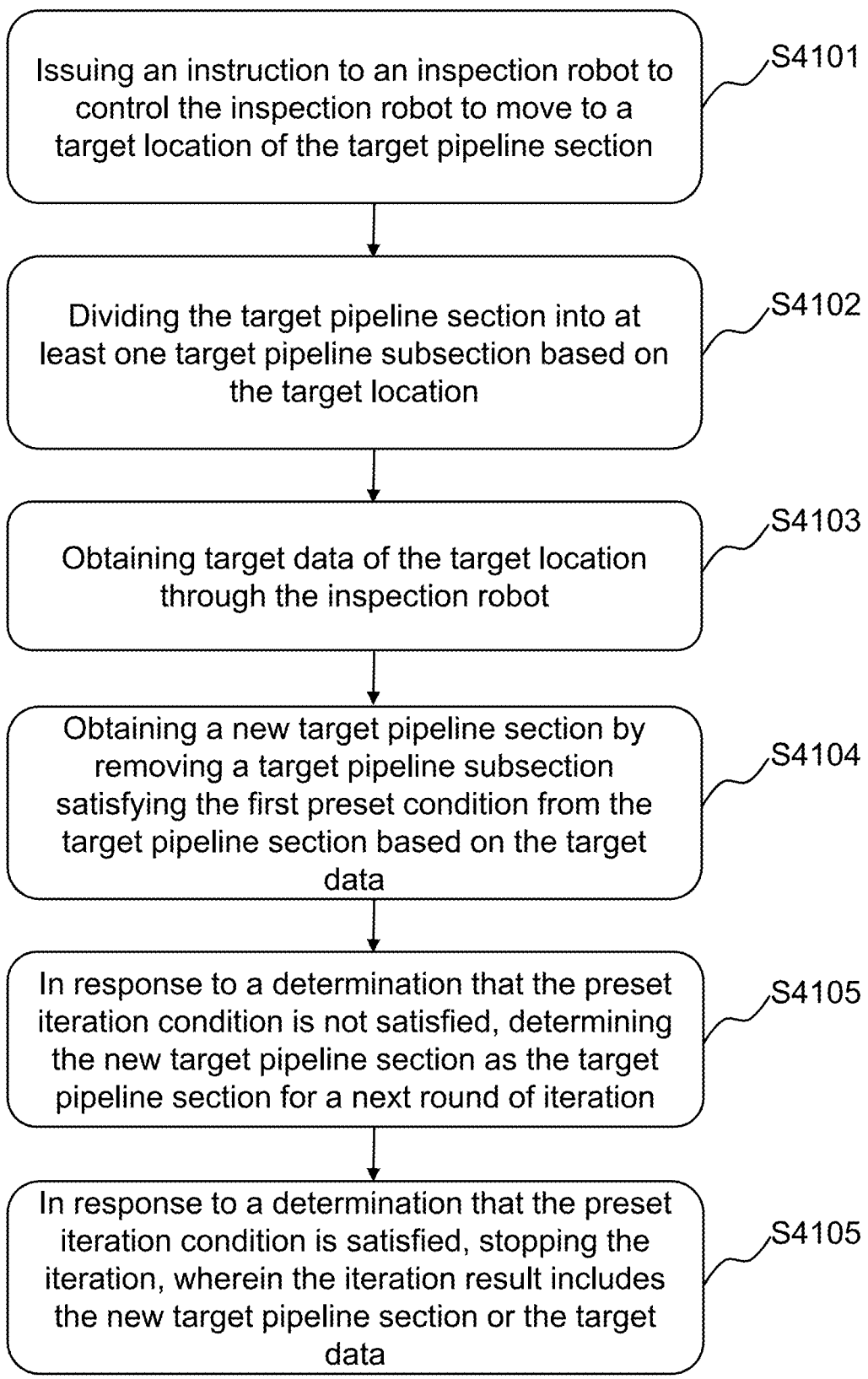
FIG. 8 is a flowchart illustrating at least one iteration of one or more iterations performed on the second pipeline data according to some embodiments of the present disclosure.

FIG. 8 is a flowchart illustrating at least one iteration of one or more iterations performed on the second pipeline data according to some embodiments of the present disclosure. In some embodiments, at least one of the one or more rounds of iteration performed on the second pipeline data includes the following operations. In some implementations, the at least one of the one or more rounds of iteration performed on the second pipeline data may be performed by the intelligent gas safety management platform 130.

In S4101, issuing an instruction to an inspection robot to control the inspection robot to move to a target location of the target pipeline section.

The inspection robot refers to an artificial intelligence device with functions of automatic inspection and monitoring. The inspection robot may simulate manual operation to inspect a gas pipeline section. For example, the inspection robot performs the operation such as identifying, inspecting the gas pipeline section. The inspection robot may include a structure such as a camera, a vibration sensor, etc. The camera is configured to identify the pipeline section and the vibration sensor is configured to obtain the vibration data located in the pipeline section. In some embodiments, the smart gas pipeline network device object platform 150 is configured as the inspection robot and the inspection robot is configured to receive a movement instruction issued by the smart gas pipeline network device sensor network platform 140 to move to the target location of the target pipeline section.

The target location is a location where a possible gas leakage point is located. There may be one or more target locations on a same target pipeline section. In some embodiments, the target location may be manually preset, the inspection robot may move to the preset target location of the target pipeline section, and the location may be marked as the target location. More ways for determining the target location may be found in FIG. 6.

In S4102, dividing the target pipeline section into at least one target pipeline subsection based on the target location.

A target pipeline subsection refers to a pipeline section that is shorter than the target pipeline section. The smart gas safety management platform 130 may divide the target pipeline section into the at least one target pipeline subsection based on the target location marked by the inspection robot. Exemplarily, the smart gas safety management platform 130 divides the target pipeline section P into target pipeline subsections 1-4 based on a first target location, a second target location, and a third target location. The target pipeline subsection 1 is a pipeline section between an endpoint P1 of the target pipeline section P and the target location A; the target pipeline subsection 2 is a pipeline section between the target location A and the target location B; the target pipeline subsection 3 is a pipeline section between the target location B and the target location C; and the target pipeline subsection 4 is a pipeline section between an endpoint P2 of the target pipeline section and the target location C.

In S4103, obtaining target data of the target location through the inspection robot.

The target data refers to data related to a pipeline corresponding to the target location. For example, the target data may be vibration data of a pipeline at the target location. For example, the target data may be a vibration frequency of 20 Hz and a vibration amplitude of 5 mm of the pipeline at the target location. The inspection robot may collect the target data at the target location through the vibration sensor based on an instruction for obtaining the data issued by the smart gas pipeline network device sensor network platform 140. The smart gas pipeline network device sensor network platform 140 sends the received target data to the smart gas data center 132.

In S4104, obtaining a new target pipeline section by removing a target pipeline subsection satisfying the first preset condition from the target pipeline section based on the target data.

The first preset condition refers to a gas leakage risk of the target pipeline subsection being smaller than a leakage risk threshold. The leakage threshold may be manually preset, for example, the preset leakage risk threshold is 80%. The target data may be analyzed by priori knowledge to determine whether the target pipeline subsection satisfies the first preset condition. For example, based on manual experience, when the vibration frequencies at both ends of the target pipeline subsection are 20 Hz, the leakage risk of the target pipeline subsection is judged to be 80%, which does not satisfy the first preset condition; and when the vibration frequencies at both ends of the target pipeline subsection are 5 Hz, the leakage risk of the target pipeline subsection is judged to be 10%, which satisfies the first preset condition. Exemplarily, if the vibration frequencies at the ends of the target pipeline subsections 1 and 2 in the target data obtained from the gas data center 132 are smaller than 20 Hz, the vibration frequencies at both ends of the target pipeline subsections 3 are greater than 25 Hz, and it is known based on historical experience that a gas pipeline with vibration frequencies smaller than 20 Hz has a relatively low risk of the gas leakage (e.g., 5%), then the smart gas safety management platform 130 can remove the target pipeline subsection 1 and the target pipeline subsection 2 from the target pipeline section and determine the target pipeline subsection 3 as the new target pipeline section.

In some embodiments, the smart gas safety management platform 130 may also remove the target pipeline subsection satisfying the first preset condition from the target pipeline section to obtain the new target pipeline section based on the leakage suspicious degree of the target pipeline subsection. For example, the higher the leakage suspicious degree of the target pipeline subsection, the greater the leakage risk is. The smart gas safety management platform 130 may remove the target pipeline subsection whose leakage risk is smaller than a leakage risk threshold from the target pipeline section. Further description regarding determining the leakage suspicious degree may be found in FIG. 5.

In S4105, in response to a determination that the preset iteration condition is not satisfied, determining the new target pipeline section as the target pipeline section for a next round of iteration.

The new target pipeline section is a remaining pipeline section that still includes the location of the gas leakage after the target pipeline subsection without the leakage risk is removed. It is understood that a length of the new target pipeline section is smaller than that of an original target pipeline section.

The preset iteration condition may be that the iteration converges or reaches a preset count of iterations. In some embodiments, the preset iteration condition may also be one of stopping the iteration when the target data is greater than a target data threshold (e.g., the vibration frequency is greater than 30 Hz or the vibration amplitude is greater than 10 mm) or stopping the iteration when the length of the target pipeline section is smaller than a length threshold (e.g., smaller than 1 m).

In S4106, in response to a determination that the preset iteration condition is satisfied, stopping the iteration, wherein the iteration result includes the new target pipeline section or the target data.

At the end of the iteration, the iteration result includes the new target pipeline section and the target data corresponding to the new target pipeline section. Exemplarily, in response to a determination that a vibration frequency of 32 Hz at the left end of the target pipeline subsection 1 is greater than the target data threshold of 30 Hz, the smart gas safety management platform 130 may stop the iteration, the new pipeline section in the iteration result is the target pipeline subsection 1, and the target data is 32 Hz. As another example, when the length of the target pipeline section 2 is 0.5 m, which is less than the length threshold of 1 m, the smart gas safety management platform 130 may stop the iteration, the new pipeline section in the iteration result is the target pipeline subsection 2, and the target data is the vibration data at both ends of the target pipeline subsection 2.

In S420, determining the location of the gas leakage based on the iteration result.

In some embodiments, the smart gas safety management platform 130 may determine the location of the gas leakage based on the new target pipeline section and/or the target data in the iteration result. For example, a location corresponding to the target data may be determined as the location of the gas leakage. As another example, a location where a length covered by the target pipeline section is located may also be determined as the location of the gas leakage.

In one or more embodiments of the present disclosure, based on the second pipeline data, the iteration result satisfying the iteration condition is obtained through the one or more rounds of iteration and the location of the gas leakage of the target pipeline section is determined based on the iteration result, so that the pipeline subsection without the gas leakage may be removed at the same time during the process of determining the location of the gas leakage, thereby improving the efficiency of troubleshooting the location of the gas leakage.

FIG. 5 is a schematic diagram illustrating an exemplary leakage suspicious degree determination model according to some embodiments of the present disclosure.

In some embodiments, the smart gas safety management platform 130 may predict a leakage suspicious degree of each target pipeline subsection through the leakage suspicious degree determination model based on the target data and remove the target pipeline subsection with the leakage suspicious degree satisfies the first preset condition from the target pipeline section.

In some embodiments, the leakage suspicious degree determination model may be a machine learning model configured to determine the leakage suspicious degree of the gas pipeline section. A type of the leakage suspicious degree determination model may be a plurality of types. For example, the type of leakage suspicious degree determination model may be a Recurrent Neural Network (RNN) model, a Deep Neural Network (DNN) model, a Long Short-Term Memory (LSTM) network model, etc.

In some embodiments, as shown in FIG. 5, the leakage suspicious degree determination model 500 may include an embedding layer 530 and a leakage suspicious degree determination layer 540.

A processing process of the embedding layer is essentially a process of extracting depth information. The embedding layer 530 may be constructed based on the DNN. In some embodiments, the embedding layer 530 may include a pipeline feature embedding layer 531 and an endpoint embedding layer 532.

The endpoint embedding layer is configured to determine an endpoint feature vector by processing endpoint feature information of the target pipeline subsection.

The endpoint feature information refers to feature information related to an end of the target pipeline subsection. For example, the endpoint feature information may be a vibration feature at the left end of the target pipeline subsection with a vibration amplitude of 4 mm and a vibration frequency of 5 Hz and a vibration feature at the right end of the target pipeline subsection with a vibration amplitude of 5 mm and a vibration frequency of 6 Hz.

The endpoint feature vector is a set of feature vectors that indicate endpoint features numerically. For example, the endpoint feature vector can be indicated as P1=(4, 5) and P2=(5, 6), which indicates the vibration feature of pipeline section P1 is the vibration amplitude of 4 mm and the vibration frequency of 5 Hz; and the vibration feature of pipeline section P2 is the vibration amplitude of 5 mm and the vibration frequency of 6 Hz.

In some embodiments, the smart gas safety management platform 130 may input the endpoint feature information 520 at both ends of the target pipeline section subsection into the endpoint embedding layer 532 to obtain the endpoint feature vectors 522 at both ends. Exemplarily, the smart gas safety management platform 130 may input the endpoint feature information of the target pipeline section subsection "the vibration feature of pipeline section P1 is the vibration amplitude of 4 mm and the vibration frequency of 5 Hz; and the vibration feature of pipeline section P2 is the vibration amplitude of 5 mm and the vibration frequency of 6 Hz" into the endpoint embedding layer 532 and the endpoint feature vectors P1=(4, 5), P2=(5, 6) is output. P1 may indicate the left end of the target pipeline subsection and P2 may indicate the right end of the target pipeline subsection.

The pipeline feature embedding layer is configured to determine a pipeline section feature vector by processing a pipeline unit feature sequence of the target pipeline section.

Exemplarily, the smart gas safety management platform 130 may input the pipeline unit feature sequence Cp={Cp1, Cp2, Cp3, . . . , Cpn} of target pipeline section P into the pipeline feature embedding layer 531 to obtain a collection (L1, L2, L3, . . . , Ln) of the pipeline section feature vectors 512 composed of n pipeline unit feature vectors, where L1-Ln are the pipeline section feature vectors corresponding to pipeline section features of pipelines from a $1^{st}$ unit to a $n^{th}$ unit, respectively. Cp1, Cp2, Cp3, . . . , Cpn are pipeline section features of pipelines from the $1^{st}$ unit to the $n^{th}$ unit located between the endpoints P1 and P2 of the target pipeline section P, respectively. Further description regarding the pipeline unit feature sequence and the pipeline section feature vector may be found in FIG. 3.

In some embodiments, the leakage suspicious degree determination layer of the leakage suspicious degree determination model is configured to determine the leakage suspicious degree of the target pipeline subsection by processing the endpoint feature vector and the pipeline section feature vector of the target pipeline subsection.

The leakage suspicious degree is a degree of suspicion that the gas leakage occurs in the pipeline section, which may be indicated as the probability that a gas leakage may occur. The leakage suspicious degree may be expressed as a percentage. The greater the percentage, the greater the risk of the gas leakage may exist.

Exemplarily, the smart gas safety management platform 130 may input the endpoint feature vector 522 "P1=(4, 5), P2=(5, 6)" of the target pipeline subsection 1 and the pipeline section feature vector 512 "L1=(100, 20, 50, 1.4)" of the target pipeline subsection 1 into the leakage suspicious degree determination layer 540 and the leakage suspicious degree of the target pipeline subsection 1 of 10% is obtained.

In some embodiments, the leakage suspicious degree determination model may be obtained by joint training of the embedding layer and the leakage suspicious degree determination layer. A second training sample may include a sample pipeline unit feature sequence including the target pipeline section and the sample endpoint feature information at both ends of the target pipeline subsection in the sample pipeline unit feature sequence. The label of the second training sample may be a tag that indicates whether a gas leakage occurs in the target pipeline section subsection corresponding to an element and the sample endpoint feature information of the element in the sample pipeline unit feature sequence. If the gas leakage occurs, the tag is marked as 1. If the gas leakage does not occur, the tag is marked as 0.

When the leakage suspicious degree determination model is trained, the sample pipeline unit feature sequence and the sample endpoint feature information of the second training sample may be input into the pipeline feature embedding layer and the endpoint embedding layer of the leakage suspicious degree determination model, respectively, the pipeline section feature vector output by the pipeline feature embedding layer and the endpoint feature vector output by the endpoint embedding layer may be input into the leakage suspicious degree determination layer of the leakage suspicious degree determination model, a second loss function may be constructed based on the leakage suspicious degree output by the leakage suspicious degree determination layer and the label of a second sample, parameters of an initial leakage suspicious degree determination model is iteratively updated based on the second loss function until a fourth preset condition is satisfied, the parameters in the leakage suspicious degree determination model is determined, and a trained leakage suspicious degree determination model is obtained. The fourth preset condition may include, but is not limited to, convergence of the second loss function, a training period reaching a threshold, etc.

In some embodiments, the smart gas safety management platform 130 may remove the target pipeline subsection satisfying the first preset condition from the target pipeline section based on the leakage suspicious degree of the target pipeline subsection. The first preset condition may be that the leakage suspicious degree of the target pipeline subsection is smaller than a suspicion threshold. The suspicion threshold may be manually preset. For example, a target pipeline subsection with a leakage suspicious degree smaller than 0.5 is removed from the target pipeline section.

In one or more embodiments of the present disclosure, the leakage suspicious degree of each target pipeline subsection is predicted by the leakage suspicious degree determination model based on the pipeline unit feature sequence and the endpoint feature information of the target pipeline subsection, which can predict the leakage suspicious degree of the target pipeline subsection more accurately and reduce the misjudgment when the target pipeline subsection is removed.

Figure 6:
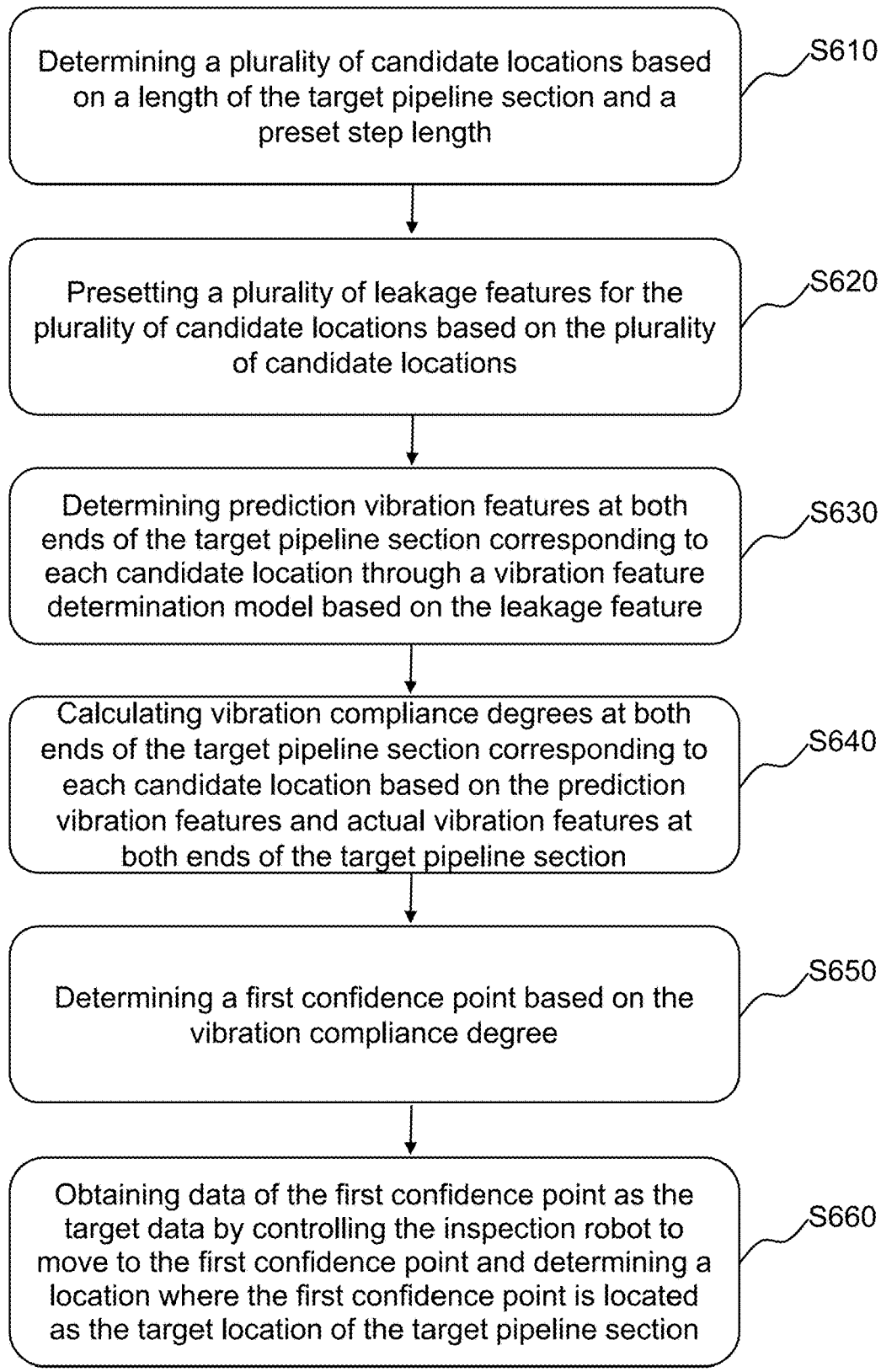
FIG. 6 is a flowchart illustrating an exemplary process for determining a target location of a target pipeline section according to some embodiments of the present disclosure.

FIG. 6 is a flowchart illustrating an exemplary process for determining an exemplary target location of a target pipeline section according to some embodiments of the present disclosure.

In S610, determining a plurality of candidate locations based on a length of the target pipeline section and a preset step length.

The preset step length of the target pipeline section is a distance between two adjacent candidate locations. The preset step length may be set manually based on experience. The lengths of a plurality of preset step lengths may be the same or different.

The candidate location refers to a location where a point manually preset on the target pipeline section is located. For example, the plurality of step lengths of 400 meters, 300 meters, 200 meters, and 100 meters may be manually set for a target pipeline section with a length of 1000 meters, three candidate locations and two endpoints of the target pipeline section may be generated based on the preset step lengths. As another example, a step length of 100 meters may be manually set for the target pipeline section with a length of 1000 meters, 9 equally spaced candidate locations and two endpoints of the target pipeline section may be generated based on the preset step length. In a similar manner, the smart gas safety management platform 130 may determine the plurality of candidate locations of the target pipeline section based on the plurality of preset step lengths.

In S620, presetting a plurality of leakage features for the plurality of candidate locations based on the plurality of candidate locations.

The leakage feature refers to a feature related to a pipeline condition of a pipeline section. For example, the leakage feature may include a crack feature, a leakage intensity, etc. at the candidate location of the pipeline section.

The crack feature may include a size of an area at the crack, a crack shape, etc. The crack shape includes, but is not limited to, a small round hole, a triangular hole, and a long hole.

The leakage intensity is configured to indicate severity of the gas leakage and may be indicated as a number within a range of 0-1. The more severe the gas leakage, the greater the leakage intensity value.

The smart gas safety management platform 130 may preset the leakage features for the plurality of candidate locations determined in the operation 610, respectively. For example, the leakage feature for candidate location A can be preset as "a crack area of 3 $mm^2$, a long hole, a leakage intensity of 0.2" and the leakage feature for candidate location B may be preset as "a crack area of 5 $mm^2$, a small round hole, a leakage intensity of 0.3." In some embodiments, the smart gas safety management platform 130 may preset at least one leakage feature for each candidate location. For example, a first leakage feature for candidate location C can be preset as "a crack area of 5 $mm^2$, a long hole, a leakage intensity of 0.4" and a second leakage feature for candidate location C can be preset as "a crack area of 3 $mm^2$, a round hole, a leakage intensity of 0.25."

In S630, determining prediction vibration features at both ends of the target pipeline section corresponding to each candidate location through a vibration feature determination model based on the leakage feature.

The prediction vibration features at both ends of the target pipeline section corresponding to the candidate locations refer to predicted vibration features at both ends of the pipeline section where the candidate location is located. Further description regarding the vibration feature may be found in FIG. 3. Merely by way of example, the leakage feature of the candidate location A determined in the operation 620 can be analyzed and studied based on manual experience, the prediction vibration feature is predicted as "a vibration frequency at the P1 end of pipeline section P is 25 Hz, a vibration amplitude is 8 mm, the vibration frequency at the P2 end of pipeline section P is 15 Hz, and the vibration amplitude is 5 mm" when the leakage feature of the candidate location A is "a crack area of 3 mm$^2$, a long hole, a leakage intensity of 0.2."

In some embodiments, the prediction vibration features at both ends of the candidate location may also be determined by the vibration feature determination model. Further description regarding determining the prediction vibration feature may be found in FIG. 7.

In S640, calculating vibration compliance degrees at both ends of the target pipeline section corresponding to each candidate location based on the prediction vibration features and actual vibration features at both ends of the target pipeline section.

The vibration compliance degree of the target pipeline section corresponding to the candidate location is a compliance degree between the prediction vibration features at both ends of the target pipeline section and the actual vibration features at both ends of the target pipeline section. The vibration compliance degree may be indicated as a percentage. The greater the percentage, the higher the compliance degree between the prediction vibration features and the actual vibration features.

In some embodiments, the vibration compliance degree of the target pipeline section may include the vibration compliance degrees at both ends of the target pipeline section. The vibration compliance degree at each end may include the vibration compliance degree of the vibration frequency and the vibration compliance degree of the vibration amplitude. The smart gas safety management platform 130 may determine the vibration compliance degree at each end of the candidate location based on a result of 1 minus an absolute value of a difference between the prediction vibration feature and the actual vibration feature divided by the actual vibration feature. For example, if the prediction vibration feature at endpoint P1 of target pipeline section P is "vibration frequency of 25 Hz, vibration amplitude of 8 mm" and the actual vibration feature is "vibration frequency of 20 Hz and vibration amplitude of 5 mm," it can be determined that the vibration compliance degree of the vibration frequency of the candidate location A at endpoint P1 is 1-|125-20|÷20× 100%=75% and the vibration compliance degree of the vibration amplitude of the candidate location A at endpoint P1 is 1-|8-5|÷5×100%=40%.

In some embodiments, the smart gas safety management platform 130 may calculate an average vibration compliance degree of the vibration compliance degree of the vibration frequency and the vibration compliance degree of the vibration amplitude of a certain candidate location and determine the average vibration compliance degree as the vibration compliance degree of each endpoint of the candidate location. For example, if for the candidate location C in the target pipeline section P (the two endpoints are P1 and P2), the vibration compliance degree between the predicted vibration frequency at the endpoint P1 and the actual vibration amplitude at endpoint P1 is 50%, the vibration compliance degree between the predicted vibration frequency at the endpoint P1 and the actual vibration amplitude at endpoint P1 is 40%, the vibration compliance degree between the predicted vibration frequency at endpoint P2 and the actual vibration amplitude at endpoint P2 is 60%, and the vibration compliance degree between the predicted vibration amplitude at endpoint P2 and the actual vibration amplitude at endpoint P2 is 70% corresponding to the candidate location C under the first leakage feature determined based on the first leak feature of the candidate location C "a crack area of 5 mm$^2$, a long hole, a leakage intensity of 0.4," the smart gas safety management platform 130 may determine that under the first leakage feature, the vibration compliance degree at the endpoint P1 corresponding to the candidate location C is (50%+ 40%)÷2=45% and the vibration compliance degree at the end of P2 corresponding to the candidate location C is (60%+70%)÷2=65%.

In S650, determining a first confidence point based on the vibration compliance degree.

The first confidence point refers to a point where a candidate location with a highest probability of the gas leakage among the candidate locations is located. The smart gas safety management platform 130 may determine the prediction vibration features at both ends of the target pipeline section corresponding to each candidate location based on the operations in the operation 630 through the vibration feature determination model. The smart gas safety management platform 130 may determine a candidate location with a greatest average and determine a point where the candidate location is located as the first confidence point based on the operations based on the operations in the operation 640, i.e., calculating the vibration compliance degrees at both ends of the target pipeline section corresponding to each candidate location under each leakage feature based on the prediction vibration features and actual vibration features at both ends of the target pipeline section and averaging the vibration compliance degrees at both ends of the target pipeline section.

For example, the target pipeline section P (the two endpoints are respectively P1 and P2) set with candidate locations of the candidate location A, the candidate location B, and the candidate location C. If the vibration compliance degree at the P1 end of the target pipeline section is 45% and the vibration compliance degree at the P2 end of the target pipeline section is 65% of the candidate location A determined based on the leakage feature "a crack area of 3 mm$^2$, a long hole a leakage intensity of 0.2," the average of the vibration compliance degrees at both ends of the target pipeline section corresponding to the candidate location A is (45%+65%)÷2=55%. If the vibration compliance degree at the P1 end of the target pipeline section is 52.5% and the vibration compliance degree at the P2 end of the target pipeline section is 67.5% of the candidate location B determined based on the leakage feature "a crack area of 5 mm$^2$, a small round hole, a leakage intensity of 0.3," the average of the vibration compliance degrees at both ends of the target pipeline section corresponding to the candidate location B is (52.5%+67.5%)÷2=60%. If the vibration compliance degree at the P1 end of the target pipeline section is 27.5% and the vibration compliance degree at the P2 end of the target pipeline section is 32.5% of the candidate location C determined based on the leakage feature "a crack area of 5 mm$^2$, a long hole, a leakage intensity of 0.3," the average of the vibration compliance degrees at both ends of the target pipeline section corresponding to the candidate location B under the first leakage feature is (27.5%+32.5%)÷2=30%. If the vibration compliance degree at the P1 end of the target pipeline section is 30% and the vibration compliance degree at the P2 end of the target pipeline section is 40% of the candidate location C determined based on the leakage feature "a crack area of 3 mm$^2$, a small round hole, a leakage intensity of 0.25," the average of the vibration compliance degrees at both ends of the target pipeline section corresponding to the candidate location C under the second leakage feature is (30%+40%)÷2=35%. The average of the vibration compliance degrees at both ends corresponding to the candidate location B is the greatest and the candidate location B can be used as the first confidence point.

In some embodiments, if a sum of the vibration compliance degrees at the two endpoints corresponding to a candidate location satisfies a vibration compliance degree threshold, the candidate location may also be determined as the first confidence point. For example, if the sum of the vibration compliance degrees at the two endpoints determined based on the candidate location is greater than 160%, the candidate location is determined as the first confidence point.

In some embodiments, the first confidence point is determined by weighted summation based on weights of the vibration compliance degrees at both ends of each candidate location. The weights are determined based on distances between the candidate location and two endpoints and a sequence element feature of a pipeline unit feature subsequence.

The distances between the candidate location and the endpoints at both ends of the target pipeline section may be determined according to an actual scale by referring to a pipeline map constructed by the smart gas pipeline network safety management platform 130. Further description regarding the pipeline map may be found in FIG. 3.

When the weighted summation is performed based on the weights of vibration compliance degrees at both ends of each candidate location, the closer the candidate location is to the endpoint, the greater the weight of the vibration compliance degree at the endpoint is set; and the higher the density of the sequence element in the pipeline unit feature subsequence between the candidate location and the endpoint, the greater the weight of the vibration compliance degree at the end is set.

Exemplarily, if the smart gas safety management platform 130 may determine that the vibration compliance degree at the endpoint P1 of the target pipeline section of the candidate location A is 45% and the vibration compliance degree at the endpoint P2 of the target pipeline section of the candidate location A is 65% and the smart gas pipeline network safety management platform 130 further determines that the distance from the candidate location A to the endpoint P1 is 50 m and the distance from the candidate location A to the endpoint P2 is 450 m, it may determine that the weight of the vibration compliance degree of the candidate location A at the endpoint P1 is 1-50/(50+450)=0.9 and the weight of the vibration compliance degree of the candidate location A at the endpoint P2 is 1-450/(50+450)=0.1 and determine that the vibration compliance degree of the vibration frequencies at both ends of the target pipeline section determined based on the candidate location A is 45%×0.9+65%×0.1=47%. As another example, the smart gas pipeline network safety management platform 130 may further determine a count of sequence elements of the pipeline unit feature subsequence between the candidate location A and the endpoint P1 and further adjust the weights of the vibration compliance degrees at both ends of the target pipeline section according to the count of elements. For example, for 1 increase in the count of sequence elements of the pipeline unit feature subsequence between the candidate location and the endpoint, the weight of the vibration compliance degree of the endpoint is increased by 0.1 and a limit of the weight is 1.

In one or more embodiments of the present disclosure, the weighted summation is performed on the vibration compliance degrees at both ends of the target pipeline section to obtain the vibration compliance degree of the target pipeline section corresponding to each candidate location and the weights of the vibration compliance degrees at both ends of the target pipeline section may be determined based on the distances between the candidate location and the two endpoints and the sequence element feature of the pipeline unit feature subsequence, so that the obtained vibration compliance degree may better reflect the influence of different locations and the distribution level of the pipeline unit feature subsequence on the vibration compliance degree and the accuracy of the determined vibration compliance degree can be improved.

In S660, obtaining data of the first confidence point as the target data by controlling the inspection robot to move to the first confidence point and determining a location where the first confidence point is located as the target location of the target pipeline section.

The inspection robot may receive a movement instruction issued by the smart gas pipeline network device sensor network platform 140 to move to the first confidence point of the target pipeline section and determine the location where the first confidence point is located as the target location of the target pipeline section. The inspection robot may receive an instruction issued by the smart gas pipeline network device sensor network platform 140 for obtaining data and obtain the target data of the target pipeline section at the target location by collecting the target data at the first confidence point through a vibration sensor.

In one or more embodiments of the present disclosure, the prediction vibration features at both ends of each candidate location are determined based on the leakage features of the plurality of candidate locations and the first confidence point is determined based on the vibration compliance degrees at both ends of each candidate location, so that the target location and the target data of the target pipeline section are determined. During the process of determining the target location of the target pipeline section, the possible leakage feature of the target pipeline section is fully considered, which can make the determined target location more accurate. In addition, the first confidence point may be determined according to the vibration compliance degree, which can make the determined first confidence point closest to the real vibration features at both ends of the target pipeline section and further improve the accuracy of the determined the target location.

Figure 7:
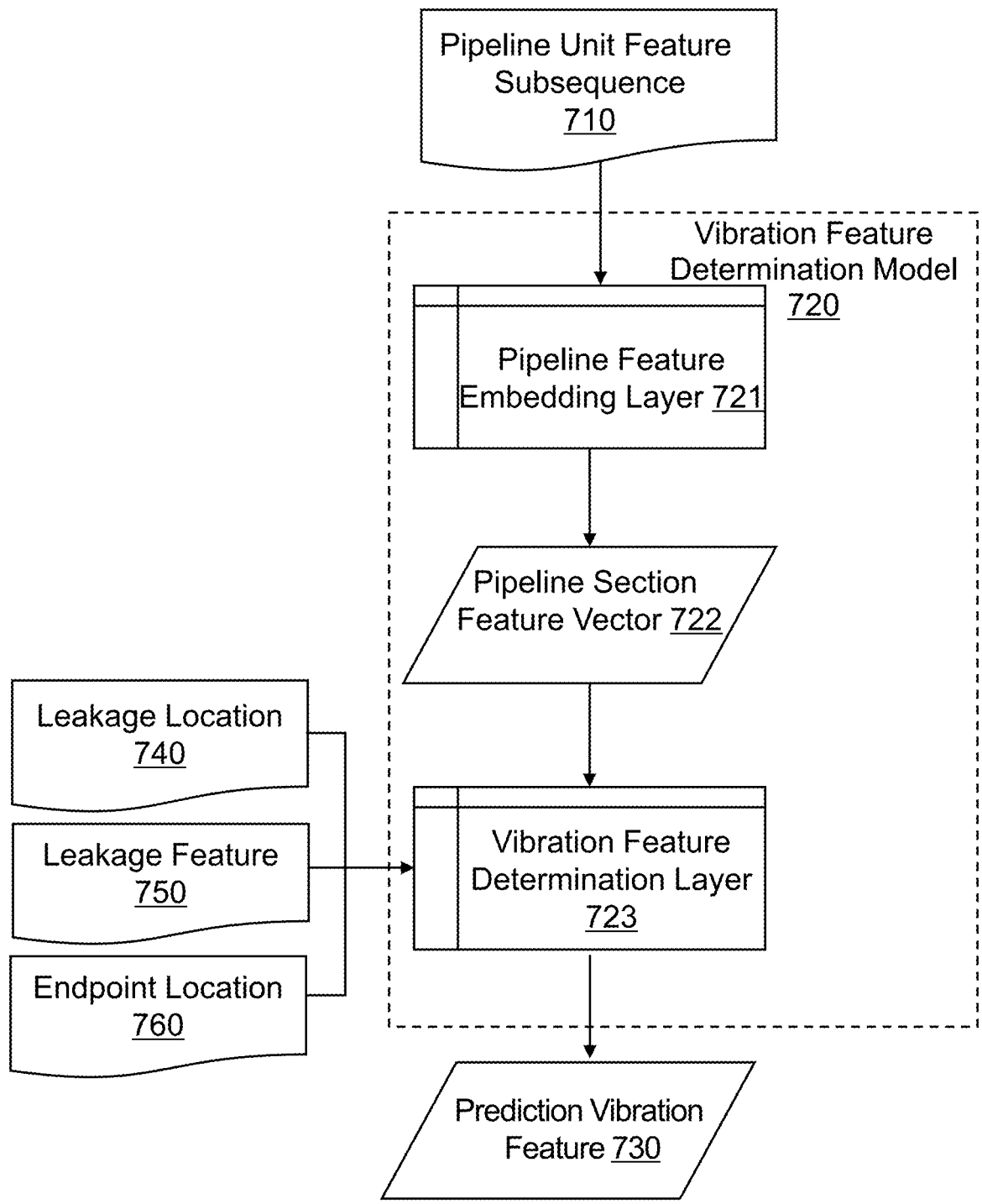
FIG. 7 is a schematic diagram illustrating an exemplary vibration feature determination model according to some embodiments of the present disclosure.

FIG. 7 is a schematic diagram illustrating an exemplary vibration feature determination model according to some embodiments of the present disclosure.

In some embodiments, as shown in FIG. 7, the vibration feature determination model 720 may include a pipeline feature embedding layer 721 and a vibration feature determination layer 723.

The pipeline feature embedding layer 721 is configured to determine a pipeline section feature vector 722 based on a pipeline unit feature subsequence 710.

For example, the smart gas safety management platform 130 can input the pipeline unit feature sequence {Cp1, Cp2, Cp3, Cp4} between the candidate locations and the endpoints into the pipeline feature embedding layer 721 and output the pipeline section feature vector as L11=(100, 20, 50, 1.4), L2=(100, 22, 50, 1.3), L3=(90, 20, 70 1.4), and L4=(80, 20, 50, 1.4).

The vibration feature determination layer 723 is configured to determine a prediction vibration feature 730 based on a plurality of leakage locations 740, leakage features 750 corresponding to the plurality of candidate locations, an endpoint location 760 of the target pipeline section, and the pipeline section feature vector 722 output by the pipeline feature embedding layer 721. Further description regarding the candidate location and the leakage feature may be found in FIG. 6.

The vibration feature determination model may be obtained by joint training of the pipeline feature embedding layer and the vibration feature determination layer. A third training sample may include a sample pipeline unit feature sequence, a sample candidate location, a sample leakage feature, and a sample endpoint location and a label of the third training sample may include a prediction vibration feature corresponding to the sample pipeline unit feature sequence.

During training, the pipeline section feature vector of the pipeline feature embedding layer, the sample candidate location, the sample leakage feature, the sample endpoint location, and the vibration feature determination layer output by the pipeline feature embedding layer may be obtained by inputting a sample pipeline unit feature sequence applied by a historical sample of a second training sample into the pipeline feature embedding layer, a third loss function may be constructed based on an output of the vibration feature determination layer and the label, a parameter of an initial pipeline feature sequence embedding layer and a parameter of an initial vibration feature determination layer may be iteratively updated based on the third loss function until a fifth preset condition is satisfied, the parameter of the initial pipeline feature sequence embedding layer and the parameter of the initial vibration feature determination layer may be determined, and a trained vibration feature determination model is obtained. The fifth preset condition may include, but is not limited to, convergence of the third loss function, a training period reaching a threshold, etc.

In one or more embodiments of the present disclosure, the prediction vibration feature of the target pipeline section is predicted by the vibration feature determination model and during the prediction of the vibration feature, depth information extraction may be performed on the pipeline unit feature sequence between the candidate location and the endpoint location, the plurality of candidate locations, the leakage feature corresponding to the candidate location, and the endpoint, which can make the obtained prediction vibration features at both ends of the target pipeline section more accurate.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for determining a gas leakage based on smart gas, implemented by a processor of a smart gas safety management platform based on an Internet of Things system for determining a gas leakage, wherein the Internet of Things system further includes a smart gas user platform, a smart gas service platform, a smart gas pipeline network device sensor network platform, and a smart gas pipeline network device object platform, wherein the smart gas user platform includes a gas user sub-platform and a supervision user sub-platform,
the smart gas service platform includes a smart gas use service sub-platform corresponding to the gas user sub-platform and a smart supervision service sub-platform corresponding to the supervision user sub-platform;
the smart gas safety management platform includes a smart gas network management sub-platform and a smart gas data center, wherein the smart gas network management sub-platform includes a pipeline network gas leakage monitoring module, a safety emergency management module, and a pipeline network geographic information management module;
the smart gas user platform includes a mobile device and a tablet computer:
the smart gas service platform further includes a processing device, wherein the processing device is a server or a server group;
the smart gas data center includes a storage device; and
the pipeline network gas leakage monitoring module, the safety emergency management module, and the pipeline network geographic information management module is the server or the server group,
the method comprising:
obtaining first pipeline data located at a plurality of points of a gas pipeline network;
determining a target pipeline section based on the first pipeline data;
obtaining second pipeline data at both ends of the target pipeline section;
determining a location of a gas leakage of the target pipeline section based on the second pipeline data, including:
performing one or more rounds of iteration based on the second pipeline data until a preset iteration condition is satisfied and an iteration result is obtained; and
determining the location of the gas leakage based on the iteration result, wherein at least one of the one or more rounds of iteration includes:
issuing a movement instruction to an inspection robot to control the inspection robot to move to a target location of the target pipeline section, wherein the inspection robot includes a camera and a vibration sensor;
dividing the target pipeline section into at least one target pipeline subsection based on the target location;
issuing an instruction for obtaining data to the inspection robot to obtain target data of the target location, wherein the target data is obtained by the inspection robot automatically identifying the target location on the gas pipeline through the camera and automatically detecting the gas pipeline at the target location through the vibration sensor;
obtaining a new target pipeline section by removing a target pipeline subsection satisfying a first preset condition from the target pipeline section based on the target data;
in response to a determination that the preset iteration condition is not satisfied, determining the new target pipeline section as the target pipeline section for a next round of iteration; or
in response to a determination that the preset iteration condition is satisfied, stopping the iteration, wherein the iteration result includes the new target pipeline section or the target data;
feeding the location of the gas leakage back to a terminal of a gas management user, wherein the gas management user refers to a user of the supervision user sub-platform in the smart gas user platform corresponding to the smart supervision service sub-platform;
in response to the terminal of the gas management user receiving the location of the gas leakage, generating a maintenance engineer dispatching instruction to dispatch the maintenance engineer in the smart gas pipeline network device object platform to the location of the gas leakage and to control a terminal of the maintenance engineer to perform maintenance on the location of the gas leakage based on the maintenance engineer dispatching instruction;
identifying a safety parameter category and sending relevant safety data to the corresponding pipeline network gas leakage monitoring module through the smart gas data center, wherein the safety parameter category includes a gas pipeline sound feature and a vibration feature; and
in response to the relevant safety data being higher than a safety monitoring threshold preset by the pipeline network gas leakage monitoring module, alarming automatically at the management platform and pushing alarm information to a supervision user automatically.

2. The method of claim 1, wherein
the smart gas pipeline network device object platform is configured to collect the first pipeline data and the second pipeline data at the plurality of points of the gas pipeline network; and
transmit the first pipeline data and the second pipeline data to the smart gas safety management platform through the smart gas pipeline network device sensor network platform.

3. The method of claim 1, wherein the determining a target pipeline section based on first pipeline data comprises:
constructing a pipeline map of the gas pipeline network based on feature information of the gas pipeline network, wherein the pipeline map comprises a node and an edge, the node corresponds to an intersection of pipeline sections, an inflection point of the pipeline section, or an installing location of a vibration sensor of the pipeline section, the edge corresponds to the pipeline section, a node feature of the node includes a torsional angle and the vibration feature, and an edge feature of the edge includes a global feature of the pipeline section;

determining, based on the pipeline map, a leakage suspicious degree of each pipeline in the pipeline map through a suspicious pipeline prediction model, wherein the suspicious pipeline prediction model is a machine learning model; and determining the target pipeline section based on the leakage suspicious degree.

4. The method of claim 3, wherein the edge feature further includes a pipeline section feature vector and the pipeline section feature vector is determined by a pipeline feature embedding layer in a leakage suspicious degree determination model based on a pipeline unit feature sequence.

5. The method of claim 4, wherein the edge feature further includes: a sequence element feature of the pipeline unit feature sequence.

6. The method of claim 1, wherein the obtaining a new target pipeline section by removing a target pipeline subsection satisfying a first preset condition from the target pipeline section based on the target data comprises:

predicting, based on the target data, a leakage suspicious degree of each target pipeline subsection through a leakage suspicious degree determination model, wherein the leakage suspicious degree determination model is a machine learning model; and removing the target pipeline subsection with the leakage suspicious degree satisfies the first preset condition from the target pipeline section.

7. The method of claim 6, wherein the leakage suspicious degree determination model includes an embedding layer and a leakage suspicious degree determination layer and the embedding layer includes an endpoint embedding layer; and the endpoint embedding layer is configured to determine an endpoint feature vector by processing endpoint feature information of the target pipeline subsection.

8. The method of claim 7, wherein the embedding layer further includes a pipeline feature embedding layer and the pipeline feature embedding layer is configured to determine a pipeline section feature vector by processing a pipeline unit feature sequence of the target pipeline section; and the leakage suspicious degree determination layer is configured to determine the leakage suspicious degree by processing the endpoint feature vector and the pipeline section feature vector.

9. The method of claim 1, wherein the determining the target location of the target pipeline section comprises:

determining a plurality of candidate locations based on a length of the target pipeline section and a preset step length;

presetting a plurality of leakage features for the plurality of candidate locations based on the plurality of candidate locations;

determining prediction vibration features at both ends of the target pipeline section corresponding to each candidate location through a vibration feature determination model based on the leakage feature, wherein the vibration feature determination model is the machine learning model, the vibration feature determination model includes a pipeline feature embedding layer and a vibration feature determination layer, the vibration feature determination model is obtained by joint training of an initial pipeline feature embedding layer and an initial vibration feature determination layer, wherein the process of the joint training includes:

obtaining a pipeline section feature vector of the initial pipeline feature embedding layer, by inputting a sample pipeline unit feature sequence applied by a historical sample of a second training sample into the initial pipeline feature embedding layer, wherein the second training sample includes a sample pipeline unit feature sequence, including the target pipeline section and sample endpoint feature information at both ends of the target pipeline subsection in the sample pipeline unit feature sequence;

inputting the pipeline section feature vector of the initial pipeline feature embedding layer, sample candidate location, sample leakage feature, sample endpoint location, and the vibration feature into the initial vibration feature determination layer:

constructing a third loss function, based on an output of the initial vibration feature determination layer and the label;

updating a parameter of the initial pipeline feature sequence embedding layer and a parameter of the initial vibration feature determination layer iteratively, based on the third loss function until a fifth preset condition is satisfied, wherein the fifth preset condition includes at least one of convergence of the third loss function and a training period reaching a threshold;

in response to the fifth preset condition being satisfied, obtaining the vibration feature determination model, based on the parameter of the initial pipeline feature sequence embedding layer and the parameter of the initial vibration feature determination layer;

calculating vibration compliance degrees at both ends of the target pipeline section corresponding to the each candidate location based on the prediction vibration features and actual vibration features at both ends of the target pipeline section;

determining a first confidence point based on the vibration compliance degree; and in response to receiving the movement instruction issued by the smart gas pipeline network device sensor network platform, controlling the inspection robot to move to the first confidence point; and in response to receiving instruction for obtaining data issued by the smart gas pipeline network device sensor network platform, controlling the inspection robot to obtain data of the first confidence point as the target data and determine a location where the first confidence point is located as the target location of the target pipeline section.

10. The method of claim 9, wherein the first confidence point is determined by weighted summation based on weights of the vibration compliance degrees at both ends of the each candidate location, wherein the weights are determined based on distances between the candidate location and two endpoints and a sequence element feature of a pipeline unit feature subsequence.

11. A non-transitory computer-readable storage medium storing computer instructions, wherein when reading the computer instructions in the storage medium, the computer executes the method of claim 1.

12. An Internet of Things system for determining a gas leakage based on smart gas, comprising: a smart gas user platform, a smart gas service platform, a smart gas pipeline network device sensor network platform, and a smart gas pipeline network device object platform, wherein the smart gas user platform includes a gas user sub-platform and a supervision user sub-platform, the smart gas service platform includes a smart gas use service sub-platform corresponding to the gas user sub-platform and a smart supervision service sub-platform corresponding to the supervision user sub-platform;

the smart gas safety management platform includes a smart gas network management sub-platform and a smart gas data center, wherein the smart gas network management sub-platform includes a pipeline network gas leakage monitoring module, a safety emergency management module, and a pipeline network geographic information management module;

the smart gas user platform includes a mobile device and a tablet computer:

the smart gas service platform further includes a processing device, wherein the processing device is a server or a server group;

the smart gas data center includes a storage device;

the pipeline network gas leakage monitoring module, the safety emergency management module, and the pipeline network geographic information management module is the server or the server group, the smart gas pipeline network device object platform is configured to collect first pipeline data and second pipeline data at a plurality of points of a gas pipeline network; and transmit the first pipeline data and the second pipeline data to the smart gas safety management platform through the smart gas pipeline network device sensor network platform; and a processor of the smart gas safety management platform is configured to:
  obtain first pipeline data located at a plurality of points of the gas pipeline network;
  determine a target pipeline section based on the first pipeline data;
  obtain second pipeline data at both ends of the target pipeline section;
determine a location of the gas leakage of the target pipeline section based on the second pipeline data, including:
performing one or more rounds of iteration based on the second pipeline data until a preset iteration condition is satisfied and an iteration result is obtained; and
determining the location of the gas leakage based on the iteration result, wherein at least one of the one or more rounds of iteration includes:
  issuing a movement instruction to an inspection robot to control the inspection robot to move to a target location of the target pipeline section, wherein the inspection robot includes a camera and a vibration sensor;
  dividing the target pipeline section into at least one target pipeline subsection based on the target location;
  issuing an instruction for obtaining data to the inspection robot to obtain target data of the target location, wherein the target data is obtained by the inspection robot automatically identifying the target location on the gas pipeline through the camera and automatically detecting the gas pipeline at the target location through the vibration sensor;
  obtaining a new target pipeline section by removing a target pipeline subsection satisfying a first preset condition from the target pipeline section based on the target data;
  in response to a determination that the preset iteration condition is not satisfied, determining the new target pipeline section as the target pipeline section for a next round of iteration; or
  in response to a determination that the preset iteration condition is satisfied, stopping the iteration, wherein the iteration result includes the new target pipeline section or the target data;

feed the location of the gas leakage back to a terminal of a gas management user, wherein the gas management user refers to a user of the supervision user sub-platform in the smart gas user platform corresponding to the smart supervision service sub-platform:
  in response to the terminal of the gas management user receiving the location of the gas leakage, generating a maintenance engineer dispatching instruction to dispatch the maintenance engineer in the smart gas pipeline network device object platform to the location of the gas leakage and to control a terminal of the maintenance engineer to perform maintenance on the location of the gas leakage based on the maintenance engineer dispatching instruction;
  identifying a safety parameter category and sending a relevant safety data to the corresponding pipeline network gas leakage monitoring module through the smart gas data center, wherein the safety parameter category includes a gas pipeline sound feature and a vibration feature; and
  in response to the relevant safety data being higher than a safety monitoring threshold preset by the pipeline network gas leakage monitoring module, alarming automatically at the management platform and pushing alarm information to a supervision user automatically.

13. The system of claim 12, wherein the determining a target pipeline section based on the first pipeline data comprises:
  constructing a pipeline map of the gas pipeline network based on feature information of the gas pipeline network, wherein the pipeline map comprises a node and an edge, the node corresponds to an intersection of pipeline sections, an inflection point of the pipeline section, or an installing location of a vibration sensor of the pipeline section, the edge corresponds to the pipeline section, a node feature of the node includes a torsional angle and the vibration feature, and an edge feature of the edge includes a global feature of the pipeline section;
  determining, based on the pipeline map, a leakage suspicious degree of each pipeline in the pipeline map through a suspicious pipeline prediction model, wherein the suspicious pipeline prediction model is a machine learning model; and
  determining the target pipeline section based on the leakage suspicious degree.

14. The system of claim 13, wherein the edge feature further includes a pipeline section feature vector and the pipeline section feature vector is determined by a pipeline feature embedding layer in a leakage suspicious degree determination model based on a pipeline unit feature sequence.

15. The system of claim 14, wherein the edge feature further includes: a sequence element feature of the pipeline unit feature sequence.

16. The method of claim 12, wherein the determining the target location of the target pipeline section comprises:

determining a plurality of candidate locations based on a length of the target pipeline section and a preset step length;

presetting a plurality of leakage features for the plurality of candidate locations based on the plurality of candidate locations;

determining prediction vibration features at both ends of the target pipeline section corresponding to each candidate location through a vibration feature determination model based on the leakage feature, wherein the vibration feature determination model is the machine learning model, the vibration feature determination model includes a pipeline feature embedding layer and a vibration feature determination layer, the vibration feature determination model is obtained by joint training of an initial pipeline feature embedding layer and an initial vibration feature determination layer, wherein the process of the joint training includes:

obtaining a pipeline section feature vector of the initial pipeline feature embedding layer, by inputting a sample pipeline unit feature sequence applied by a historical sample of a second training sample into the initial pipeline feature embedding layer, wherein the second training sample includes a sample pipeline unit feature sequence including the target pipeline section and sample endpoint feature information at both ends of the target pipeline subsection in the sample pipeline unit feature sequence;

inputting the pipeline section feature vector of the initial pipeline feature embedding layer, the sample candidate location, sample leakage feature, sample endpoint location, and the vibration feature into the initial vibration feature determination layer;

constructing a third loss function, based on an output of the initial vibration feature determination layer and the label:

updating a parameter of the initial pipeline feature sequence embedding layer and a parameter of the initial vibration feature determination layer iteratively, based on the third loss function until a fifth preset condition is satisfied, wherein the fifth preset condition includes at least one of convergence of the third loss function and a training period reaching a threshold;

in response to the fifth preset condition being satisfied, obtaining the vibration feature determination model, based on the parameter of the initial pipeline feature sequence embedding layer and the parameter of the initial vibration feature determination layer;

calculating vibration compliance degrees at both ends of the target pipeline section corresponding to the each candidate location based on the prediction vibration features and actual vibration features at both ends of the target pipeline section;

determining a first confidence point based on the vibration compliance degree; and in response to receiving the movement instruction issued by the smart gas pipeline network device sensor network platform, controlling the inspection robot to move to the first confidence point; and in response to receiving instruction for obtaining data issued by the smart gas pipeline network device sensor network platform, controlling the inspection robot to obtain data of the first confidence point as the target data and determine a location where the first confidence point is located as the target location of the target pipeline section.

* * * * *